(12) United States Patent
Tunnell et al.

(10) Patent No.: US 10,453,053 B2
(45) Date of Patent: Oct. 22, 2019

(54) SYSTEMS AND DEVICES FOR WIRELESS CHARGING OF A POWERED TRANSACTION CARD AND EMBEDDING ELECTRONICS IN A WEARABLE ACCESSORY

(71) Applicant: Fit Pay, Inc., Carlsbad, CA (US)

(72) Inventors: Andrew Tunnell, Palm Bay, FL (US); David Tunnell, Palm Bay, FL (US)

(73) Assignee: Fit Pay, Inc., Carlsbad, CA (US)

( * ) Notice: Subject to any disclaimer, the term of this patent is extended or adjusted under 35 U.S.C. 154(b) by 789 days.

(21) Appl. No.: 14/843,925

(22) Filed: Sep. 2, 2015

(65) Prior Publication Data

US 2016/0104151 A1    Apr. 14, 2016

Related U.S. Application Data

(60) Provisional application No. 62/044,496, filed on Sep. 2, 2014.

(51) Int. Cl.

| G06Q 20/36 | (2012.01) |
| G06Q 20/34 | (2012.01) |
| H02J 7/00 | (2006.01) |
| H02J 50/00 | (2016.01) |

(52) U.S. Cl.
CPC ......... G06Q 20/363 (2013.01); G06Q 20/341 (2013.01); H02J 7/0042 (2013.01); *H02J 50/00* (2016.02)

(58) Field of Classification Search
None
See application file for complete search history.

(56) References Cited

U.S. PATENT DOCUMENTS

| 5,221,838 | A | 6/1993 | Gutman | |
| 8,594,730 | B2 | 11/2013 | Bona | |
| 8,977,569 | B2 | 3/2015 | Rao | |
| 2002/0179704 | A1 | 12/2002 | Deaton | |
| 2007/0163689 | A1* | 7/2007 | Pace | A45C 3/08 150/105 |
| 2009/0077675 | A1 | 3/2009 | Cabouli | |
| 2009/0088077 | A1* | 4/2009 | Brown | H04B 5/02 455/41.2 |
| 2009/0240625 | A1* | 9/2009 | Faith | H02J 7/025 705/65 |
| 2013/0311372 | A1* | 11/2013 | Ramaci | G06Q 20/322 705/44 |
| 2017/0132613 | A1* | 5/2017 | Tunnell | G06Q 20/363 |

* cited by examiner

*Primary Examiner* — Daniel J Cavallari
(74) *Attorney, Agent, or Firm* — Samuel M. Korte; Max M. Ali

(57) ABSTRACT

A system and device to add electronics to materials to form a smart wallet. An electronic wallet (also referred to as a smart wallet) stows and retrieves financial as well as personal information such as credit cards, debit cards, identification, coupons, and the like. Electrical features include techniques and elements for a user to interact with the smart wallet via an interface that governs interaction, for securing information in the smart wallet, and for charging a power source on a powered transaction card. Mechanical features of the electronic wallet include techniques for integrating electronics within wallets to add electronic wallet functionality. Several accessory styles are also disclosed.

8 Claims, 39 Drawing Sheets

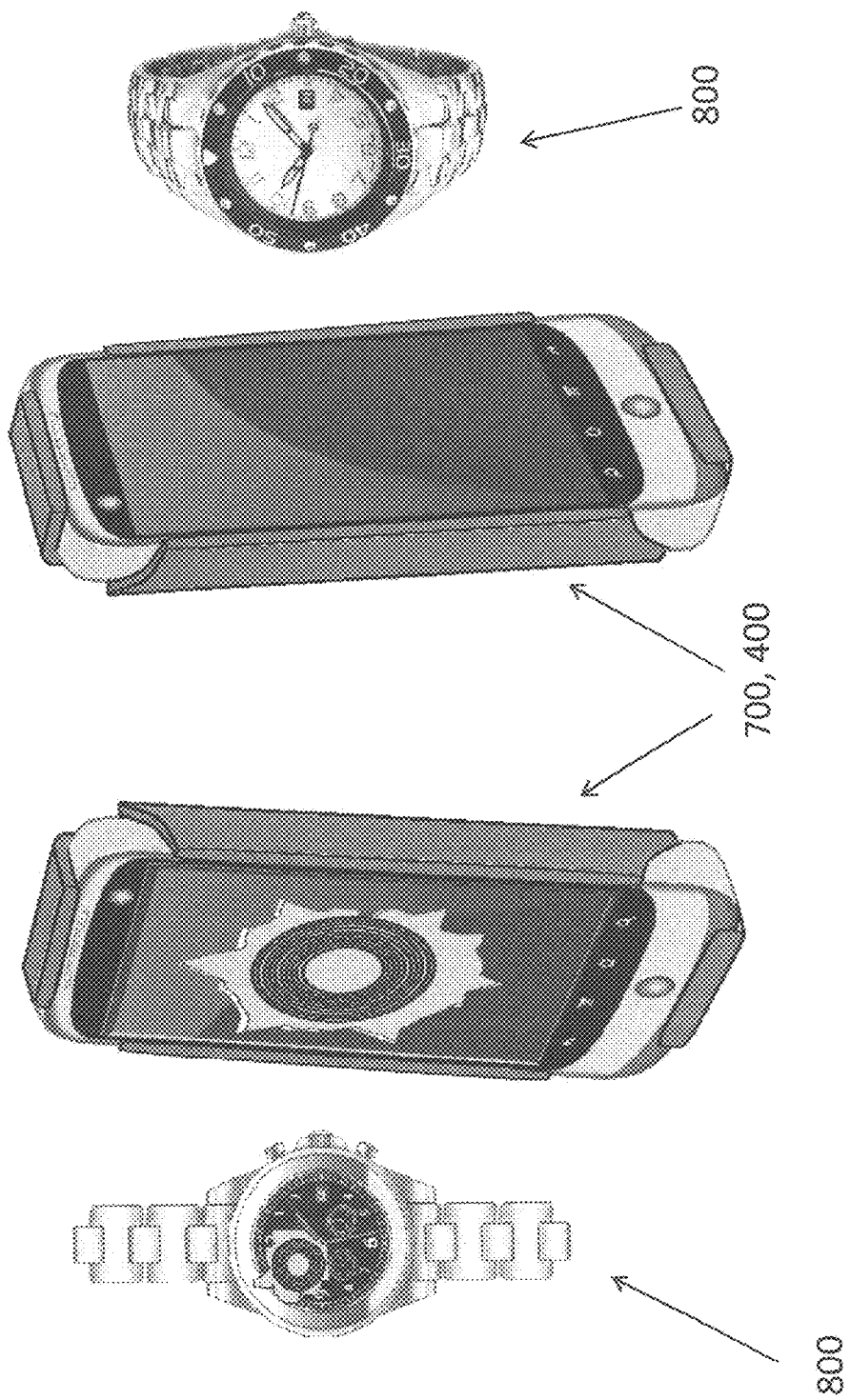

SYSTEMS AND DEVICES FOR WIRELESS CHARGING OF A POWERED TRANSACTION CARD AND EMBEDDING ELECTRONICS IN A WEARABLE ACCESSORY

CROSS REFERENCE TO RELATED APPLICATIONS

This patent application claims the benefit of U.S. provisional patent application filed on Sep. 2, 2014, assigned Application No. 62/044,496, and entitled Methods and Systems to Add Electronics to Materials to Form a Smart Wallet, the contents of which are incorporated herein in its entirety.

FIELD

The present invention relates to the general field of charging electronic wallets, wearable accessories, and transaction cards.

BACKGROUND

As electronic wallets become more prominent, electrical and mechanical design is of heighted importance. The design affects not only the appearance of the wallet, but also its functionality. Features such as how electronics are added to materials, how a user interface fits with other features of the wallet, and insertion/removal of batteries are just a few design aspects of an electronic wallet that affects its appearance and functionality.

Little innovation in this area has emerged within the field of electronic wallets. In particular, attachment methods to attach electronics to materials that form an integrated smart wallet impact the functionality of the wallet and its usability. In the past, smart wallets have used clamshell designs, such as illustrated in US 20090077675 A1. This published patent application describes a hard shell to integrate electronics, not how to integrate electronics to conform to most widely accepted wallet materials such as leather and nylon. Other prior art references such as U.S. Pat. No. 5,221,838 and US published patent application 20020179704 focus on electronic aspects of the wallet and do not take into account physical or mechanical aspects such as how the battery is inserted and extracted from the electronic wallet or how accessories may be attached and removed from a smart wallet to "accessorize" the wallet.

SUMMARY

The present invention relates to techniques to physically configure electronic, digital and/or smart wallets (or a wearable accessory), heretofore called "smart wallets", with specific features that enhance appearance and functionality. Electrical features include methods and components for a user to interact with the smart wallet via an interface that governs interaction and features to secure information, as non-limiting examples. Mechanical features include techniques for integrating electronics components and devices (herein sometimes referred to as "electronics") within material structures, including flexible structures in some embodiments, to add electronic functionality to form a smart wallet or a smart wallet.

Electronics may include, but are not limited to combinations of any number of the following components heretofore singularly, collectively or in combination called "electronics" as shown in FIG. 1: a microprocessor or a microcontroller, a memory, crypto devices, anti-tamper devices, a display, a semi or fully transparent touch display, switches, proximity sensors, a microphone, amplifiers, a speaker, biometric sensors, optical sensors, LEDs, wireless battery recharging devices, power harvesting circuitry and various wireless interfaces including but not limited to Bluetooth, BLE (Bluetooth Low Energy), RFID, WiFi, Edge, 3G, 4G, LTE, 801.15.4 or virtually any wireless interface and protocol. Those familiar with the art will recognize that variations of these electronics comprise electronics that can be added to material structures to form a smart wallet. For instance, non-limiting examples include electronics that utilize displays, buttons, speakers and/or a microphone as interfaces to a user, and/or combinations of each. Likewise, elements for holding removable batteries in place are also offered in the present invention as are features to facilitate user interaction with the smart wallet and its components and devices.

Techniques for attaching accessories to electronics include but are not limited to groove, slide-and-lock elements, single-lock elements, and clip elements. These techniques and components can be used to form an accessorized electronic wallet or an accessorized smart wallet within a variety of forms such as but not limited to wallets, purses, luggage, bracelets, anklets, necklaces, wrist bands, belts, belt buckles, wrings, mobile accessories and just about any mobile or wearable accessory that are commonly carried or worn by individuals collectively referred hereafter as "accessories". A user may interchange various colors and styles of accessories to fit a particular application or venue and can create pockets in the smart wallet for carrying various items therein.

Those versed in the art recognize that numerous colors and styles of wallet accessories may be attached to an electronics module to provide different appearances and functions. Several embodiments demonstrate the wide versatility of accessories with integrated electronics. Likewise, other embodiments demonstrate versatility of accessories that hold other accessories such as but not limited to a powered-card with one or more extra pockets to hold other cards (referred to generally as transaction cards such as credit cards, debit cards, identity cards, gift cards, coupons, cards carrying financial or personal information, and the like), cash and/or other personal information. Non-limiting examples of accessories include but are not limited to single-pocket with no window, single-pocket with a clear window, top-fold, side-fold, side-back-fold and back-fold.

In some embodiments, each accessory is configured with mechanical features to align and hold a powered card in a specific position relative to the electronics. The mechanical position of the accessory relative to electronics is controlled such that various features might be supported, such as wake-up of the powered card, communications and recharging of a battery and/or super capacitor within a powered card, as non-limiting examples. This technique of mechanically controlling the relationship of electronics between two devices within an accessory achieves a first "on-person rechargeable wearable device" where electronics within an accessory may work with electronics within a powered card and/or mobile or wearable device to charge a battery or capacitor within the electronic card. Powered cards may include smart cards, identity cards, or any card with passive, semi-passive, fully powered or virtually any electronics components.

Each accessory conforms to mechanical design features that enable materials to be attached to electronics while also allowing electronics within a powered card to be aligned and held in position relative to electronics within a smart wallet. In one non-limiting embodiment the alignment and material attachment is achieved via an "accessory mount" that governs how wallet accessories and powered cards integrate with electronics.

The present invention identifies several techniques to attach material to electronics, including but not limited to a hole and latch technique, glue and clamp techniques, stitch elements, bezel elements, and sonic welding. Those in the field of art will recognize that materials for such smart wallet accessories may include leather, synthetic leather, and nylon as non-limiting examples.

In various embodiments, locking mechanisms keep folds in currency and cardholders locked in a closed position. These include but are not limited to one or more plastic, clips, magnets, hook and loop fasteners, and/or a zipper within or on the material of the currency and cardholder. In some embodiments, the electronics within the smart wallet can connect to docking stations and other peripherals via wired and/or wireless methods.

BRIEF DESCRIPTION OF THE DRAWINGS

FIG. 39 shows a non-limiting example of wearable electronics that could be charged via an on-person charging method, in this example charging within a sleeve on a mobile device.

DETAILED DESCRIPTION

Before describing in detail the particular methods and apparatuses related to methods for adding electronics to materials to form smart wallets and other non-limiting objects made from materials, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments.

The presented embodiments are not intended to define limits as to the structures, elements or methods of the inventions, but only to provide exemplary constructions. The embodiments are permissive rather than mandatory and illustrative rather than exhaustive.

The present invention configures wallets with specific electrical and mechanical features that enhance appearance and functionality. Electrical features include methods and components for a user to interact with the smart wallet via an interface that governs that interaction and features to secure information, as non-limiting examples. Mechanical features include techniques for integrating electronics components and devices (herein sometimes referred to as "electronics") within material structures, including flexible structures in some embodiments, to add electronic functionality to the structure to form a smart wallet.

Techniques for attaching accessories to electronics and for attaching accessories to a smart wallet include but are not limited to adhesives, grooves and mating protrusions, slide-and-lock elements, single-lock elements, and clip elements. These techniques and components can be used to form an accessorized electronic wallet or an accessorized smart wallet within a variety of forms such as but not limited to wallets, purses, luggage, bracelets, anklets, necklaces, wrist bands, belts, belt buckles, wrings, mobile accessories and just about any mobile or wearable accessory that are commonly carried or worn by individuals collectively referred hereafter as "accessories". A user may interchange various colors and styles of accessories to fit a particular application or venue and can create pockets in the smart wallet for carrying various items therein.

Figure 1:
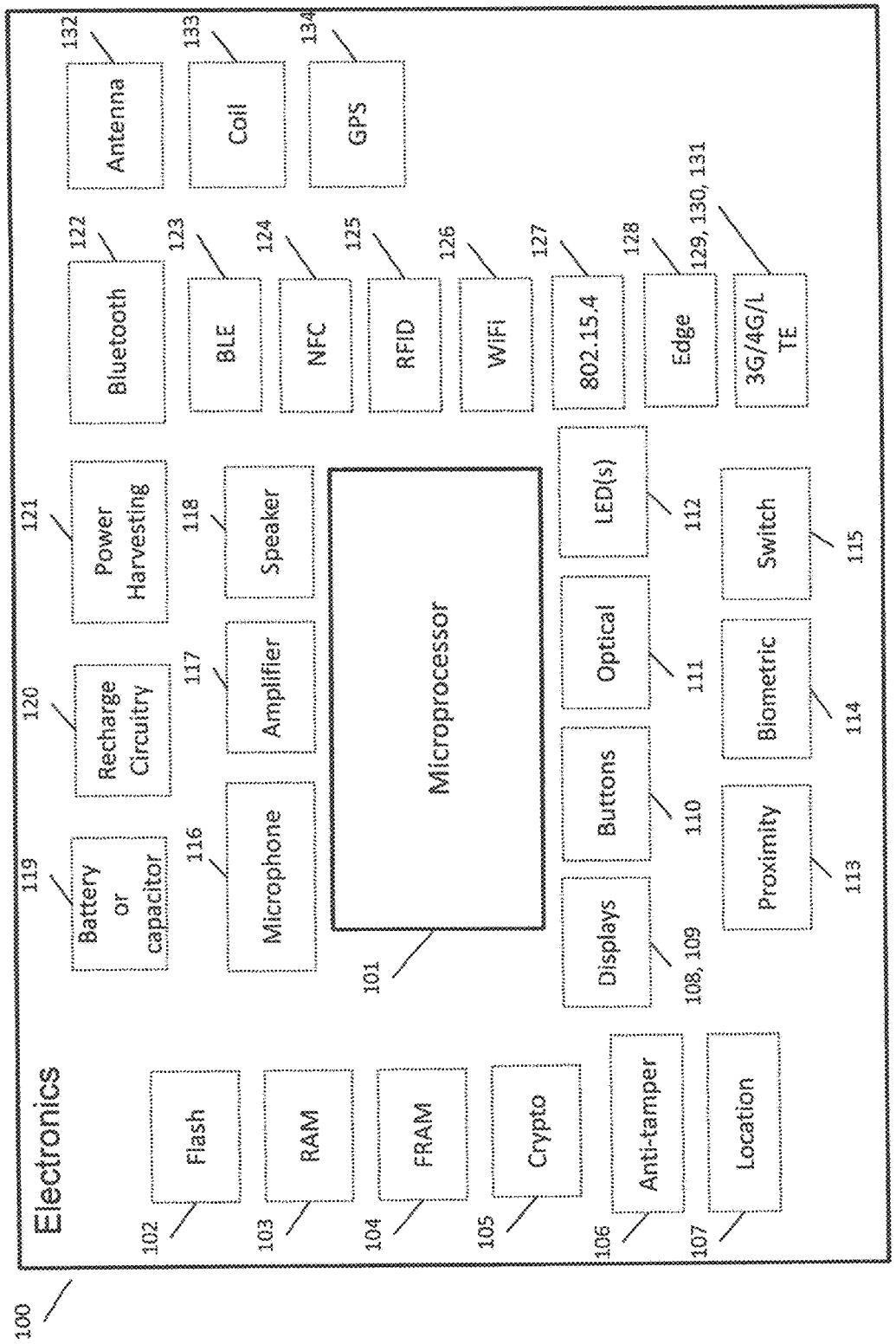
FIG. 1 illustrates a block diagram of non-limited examples of components that can comprise electronics according to the present invention.

Electronics (also referred to as electronics components) may include combinations of any number of the following components herein singularly, collectively or in combination called "electronics" 100 as shown in FIG. 1: microprocessor or microcontroller 101, memory (flash 102, RAM 103, and/or FRAM 104), crypto devices 105, anti-tamper devices 106, location devices 107 such as but not limited to GPS 134, displays 108, semi or fully transparent touch display 109, button 110, optical sensors 111 such as but not limited to infrared, photodiodes, and/or image sensors, LED 112, proximity sensors 113, biometric sensors 114 such as but not limited to finger, heartbeat, face, IRIS and voice sensors, switches 115, microphone 116, amplifier 117, speaker 118, battery (or super capacitor) 119, wireless battery recharging circuitry 120, power harvesting sensors and circuitry 121 and various interfaces including but not limited to Bluetooth 122, BLE (Bluetooth Low Energy) 123, NFC (Near Field Communications) 124, RFID 125, Wi-Fi 126, communications devices operating according to the specification 801.15.4 127, Edge devices 128, 3G devices 129, 4G devices 130, LTE devices 131, antennas 132, coils 133, or virtually any other electronic component. Other non-limiting examples include electronics that utilize displays 108, touch panels or touch screens 109, buttons 110, speakers 118, microphones 116, image sensors 111 and other sensors as interfaces to a user, and/or combinations of any electronics.

Those familiar with the art will recognize that variations of these electronics constitute electronics that can be added to materials to form a smart wallet. Additionally, these devices and the associated communications interfaces and protocols can be used for communicating between two electronics modules that are both carried within or housed with a smart wallet.

Figure 2:
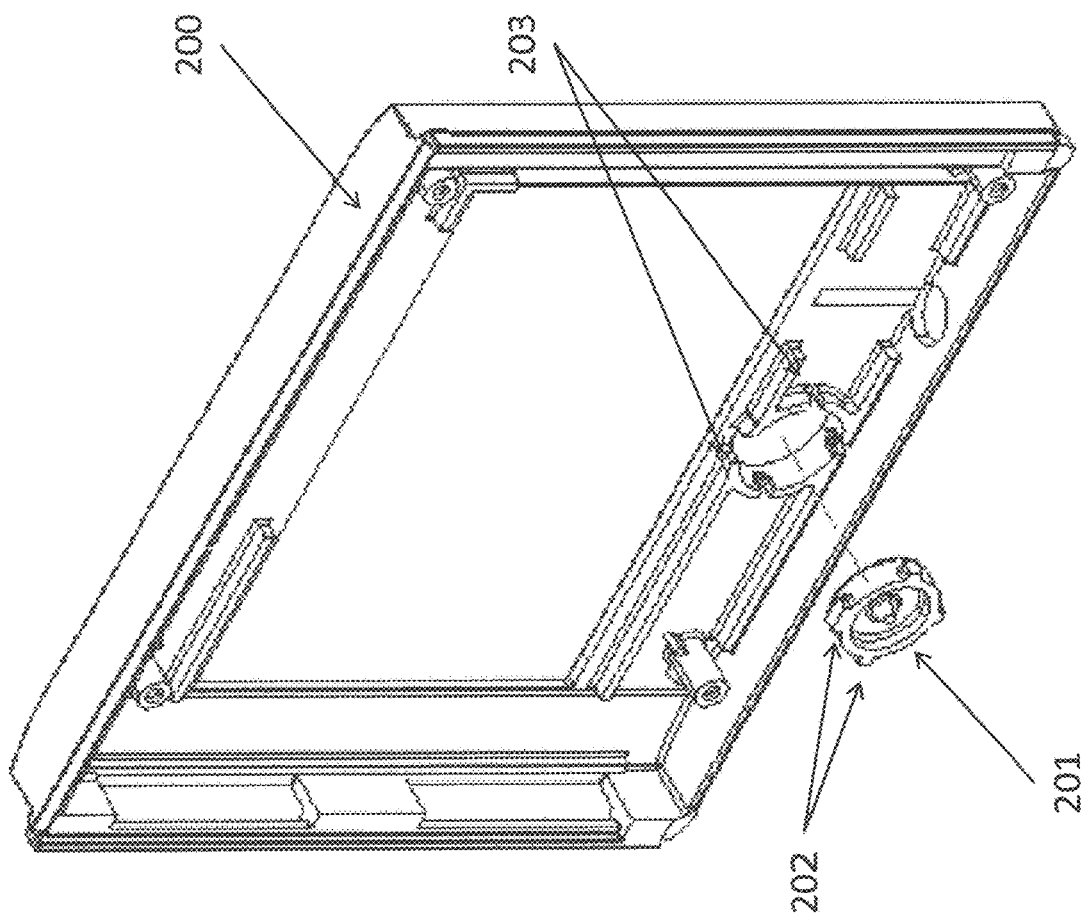
FIG. 2 illustrates a non-limiting example of how a button cover fits into an electronics enclosure.

FIG. 2 illustrates a non-limiting embodiment of how a button cover 201 fits into an electronic enclosure 200 by means of one or more tabs 202 that are received within compatible grooves 203 located on the enclosure. This technique enables a button cover 201 to slide within the grooves of the outer enclosure 200 and engage a tactile switch with spring action located on a printed circuit board (PCB) positioned behind the enclosure 200. This arrangement of components provides a tactile feel to the user.

The button cover 201 may have a logo on and/or within the button that is formed utilizing manufacturing methods including but not limited to embossing, in-mold labeling, and/or laser etching. The button cover 201 may be used for a variety of features including turning smart wallet electronics on and/or off, setting one or more LEDs and/or front or backlights to various illumination levels and/or on or off, bringing up a settings or configuration page, or activating various interfaces such as but not limited to voice authentication, voice card, or touch interfaces. The button cover may also be used to activate an embedded fingerprint sensor or other biometric sensors such as but not limited to a voice, facial, iris or heartbeat scanner or reader. In some embodiments, the button icon, logo or other design may be illuminated using LEDs or equivalent under a semi-translucent button cover 201.

Figure 3:
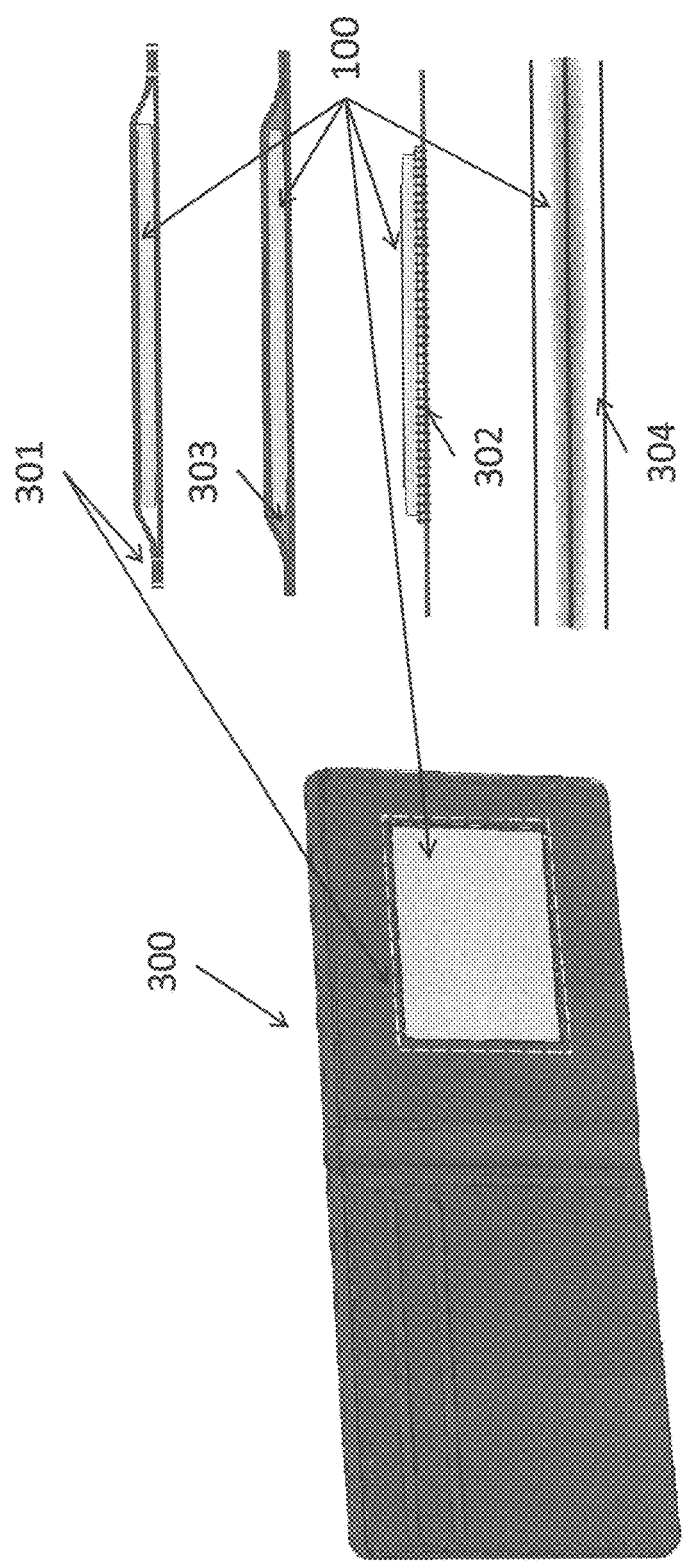
FIG. 3 illustrates techniques to attach electronics directly to wallet material such as but not limited to fabric, nylon or leather.

This invention describes specific implementations regarding how to physically add electronics 100 to materials 300 (see FIG. 3) to form a smart wallet, that may also be referred to, but not limited to, an electric wallet, an electronic wallet, a digital wallet, an intelligent wallet, and/or a smart wallet.

In some embodiments, electronics attach directly to wallet material 300, such as but not limited to fabric, nylon or leather. In one embodiment, electronics may be added to a wallet structure by stitching 301 one or more materials 300 within the wallet structure to perforations 302 in one or more sides of the electronics 100 to hold the electronics 100 in place within the wallet.

In another embodiment, electronics 100 may be glued to one or more materials 300, or between layers of materials 300 within the wallet structure. In another embodiment, electronics may be laminated between one or more layers or covers. In some variations of this embodiment, the laminated structure may then be attached to other materials, such as but not limited to leather, by various means including further laminating, bonding, gluing and/or stitching. In yet another embodiment, glue 303, such as but not limited to PVC glue, can be applied such that the solvent 303 melts the plastic of the outer enclosure of the electronics 100 to form a strong physical bond with the material 300 such that the wallet material 300 and outer enclosure of the electronics 100 becomes firmly joined to form a structure 304.

In some embodiments, a combination of these techniques can be applied to strengthen the bond between electronics 100 and the wallet material 300. COG (chip on glass) and COF (chip on flex) techniques may also be utilized to add electronics to materials as in some non-limiting embodiments. Those versed in the art will recognize that COG entails adding one or more chips, including but not limited to a microprocessor to the glass of a display. COF on the other hand entails adding one or more chips including but not limited to a microprocessor to a flex circuit. Certain techniques may make the wallet thinner, thereby providing a more portable design.

Figure 4:
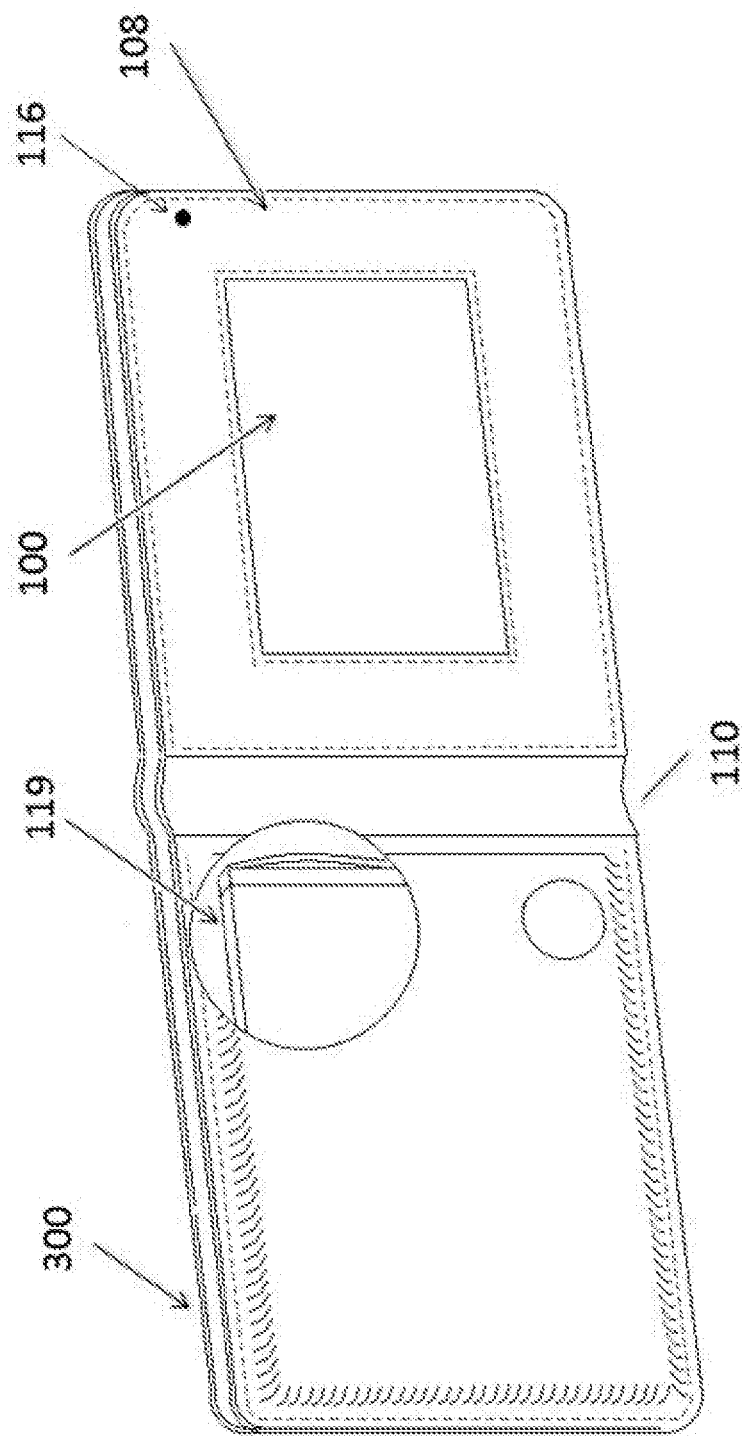
FIG. 4 illustrates how electronic components, such as but not limited to batteries, displays, microphones, speakers and buttons, may be housed separately from other electronics, distributed throughout materials.

One versed in the art will recognize that the electronics 100 may also be partitioned within the material 300 such that components are not necessarily collocated such as shown in FIG. 4. For example, a non-limiting technique of partitioning might separate the battery and/or super capacitor 119 from other electronics 100 such as but not limited to the display 108 and its associated electronic components. Likewise, a microphone 116 could be located separately from a display, separate from battery and/or super capacitor 119, or control button(s) 110, or other sensors and electronics 100 as in some non-limiting embodiments. These particular embodiments illustrate non-limiting techniques to reduce thickness within materials structures while adding electronic functionality to the structure.

For those embodiments that include a display 108, it is recognized that the display 108 may comprise a flexible display and the electronics 100 can thus be flexible by fabricating on a flexible substrate such as but not limited to FPC (flexible printed circuit material). As a non-limiting example, a display may include E-paper In some non-limiting embodiments, one or more sensors and/or control buttons may control the wallet and/or one or more functions thereof. Such buttons or sensors may be located on top of the display as in some non-limiting embodiments. However, in other non-limiting embodiments, the buttons or sensors may be outside the display. By placing buttons or sensors outside of the display, the display image may be clearer by decreasing the amount of interfering material. The wallet may also be thinner if this feature is adopted.

Some embodiments of the present invention comprise a method or structure without a display. Herein, a user may use means including but not limited to a microphone or a touch sensitive device to direct and/or control (either through sound/voice recognition or touch) a smart wallet either with interface local to the smart wallet, or remote to the external smart wallet such as controls on a separate mobile device that communicates with the smart wallet.

Figure 5:
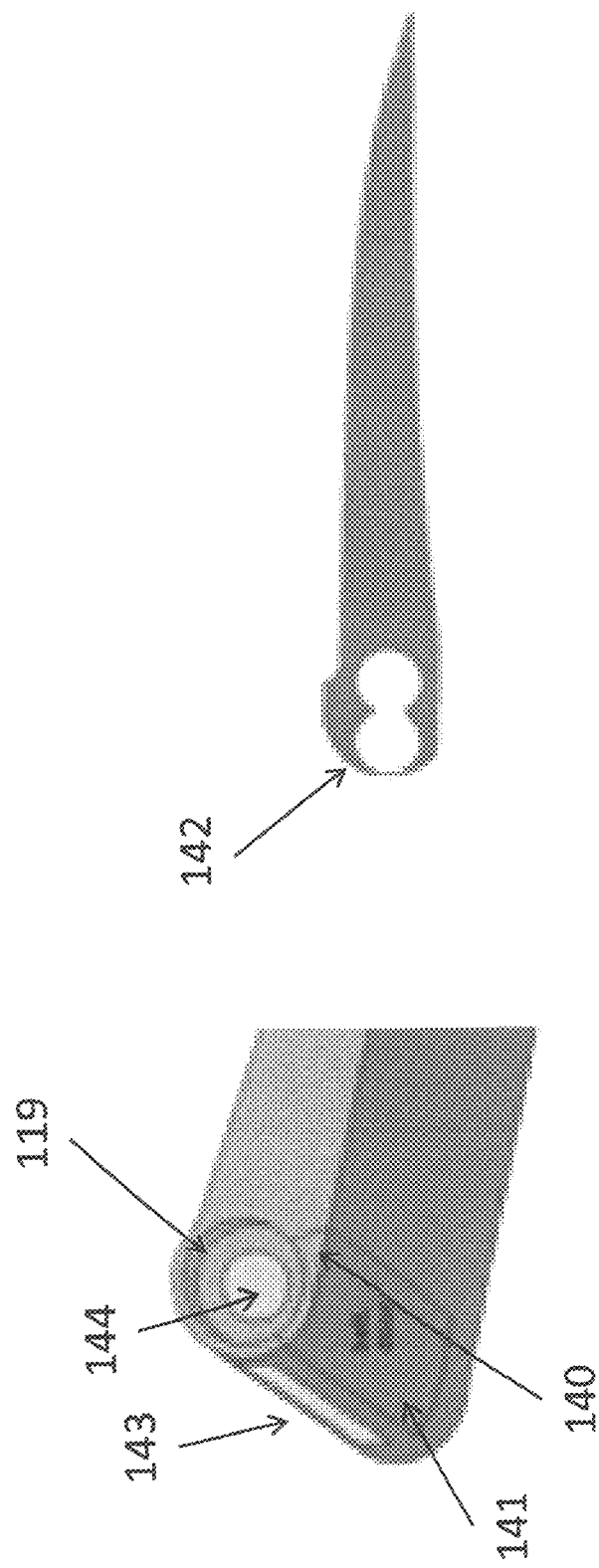
FIG. 5 illustrates techniques to house one or more batteries in the seam of a wallet and to form a hinge, in some embodiments.

Batteries and/or capacitor 119 are examples of electronic components that can vary in size and shape. Thus, the batteries and/or super capacitors may be housed directly within an electronic smart wallet (as compared to housing the batteries on a printed circuit card carrying by the smart wallet) according to a number of different techniques. One such non-limiting technique introduces the idea of embedding one or more batteries 119 in the "seam" or edge 140 of the wallet enclosure as shown in FIG. 5. Under such embodiments, one or more batteries 119 are embedded within one or more sides of the wallet, with one or more components for inserting and removing the battery, such as but not limited to a panel 141. In some configurations, the edge may support more than one battery 119 with battery holders 142 that can support various common battery sizes such as but not limited to AA or AAA batteries. In other embodiments, the area where the battery 119 is inserted may act as a hinge so that layers of the wallet may rotate around the battery 119. In yet another embodiment, the edge of the wallet may also be used as a light comprising light pipes 143 and/or LEDs 144.

Figure 6:
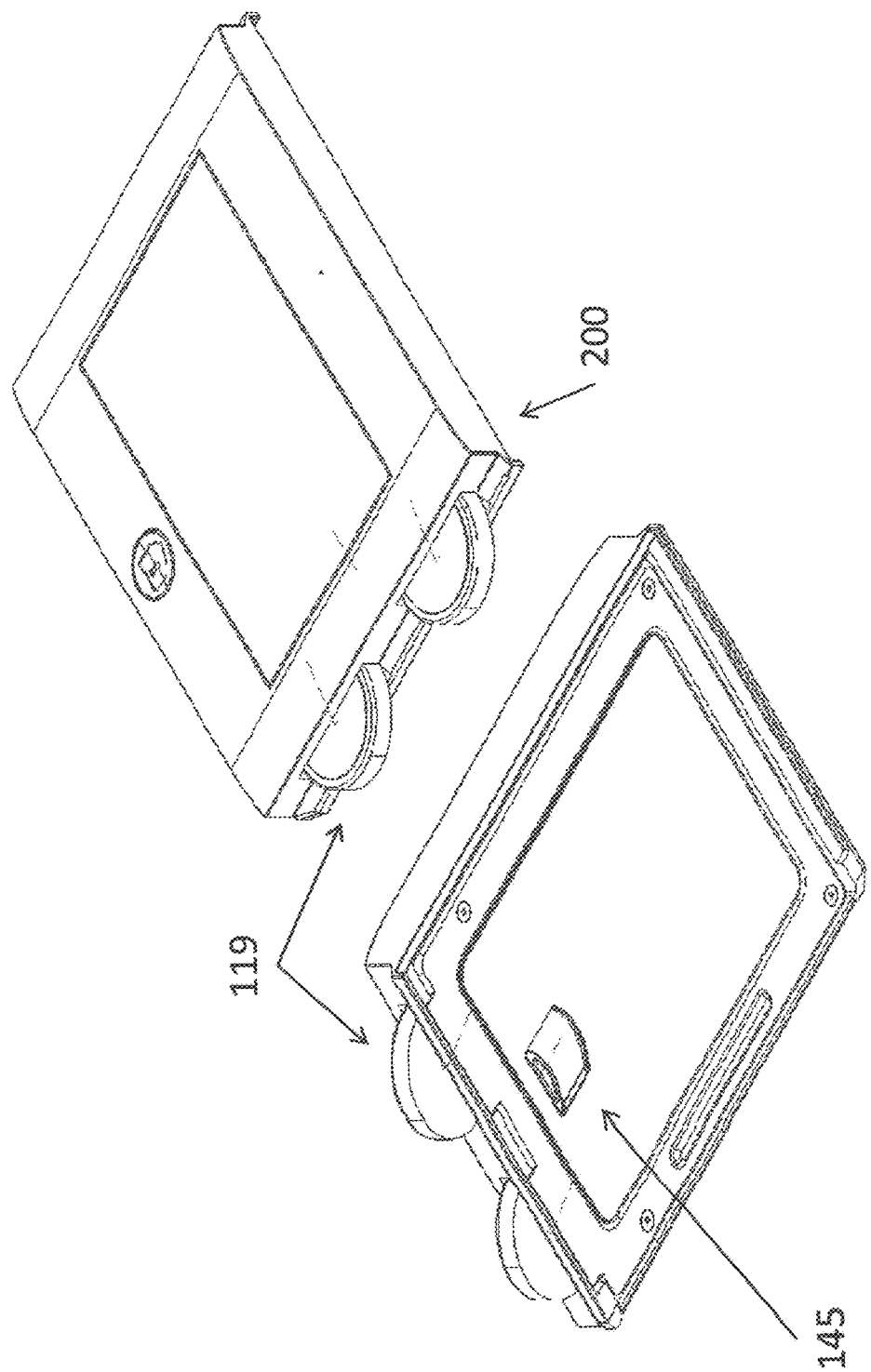
FIG. 6 illustrates a switch or extractor for use in inserting and ejecting batteries.

A power supply may consist of one or more batteries and/or super capacitors 119 to power the electronics 100 disposed within the enclosure 200. Batteries 119 may be rechargeable or non-rechargeable with removable techniques illustrated in FIG. 6. In this embodiment, a mechanical switch or a battery extractor 145 may be used to insert or eject the removable batteries 119.

Figure 7:
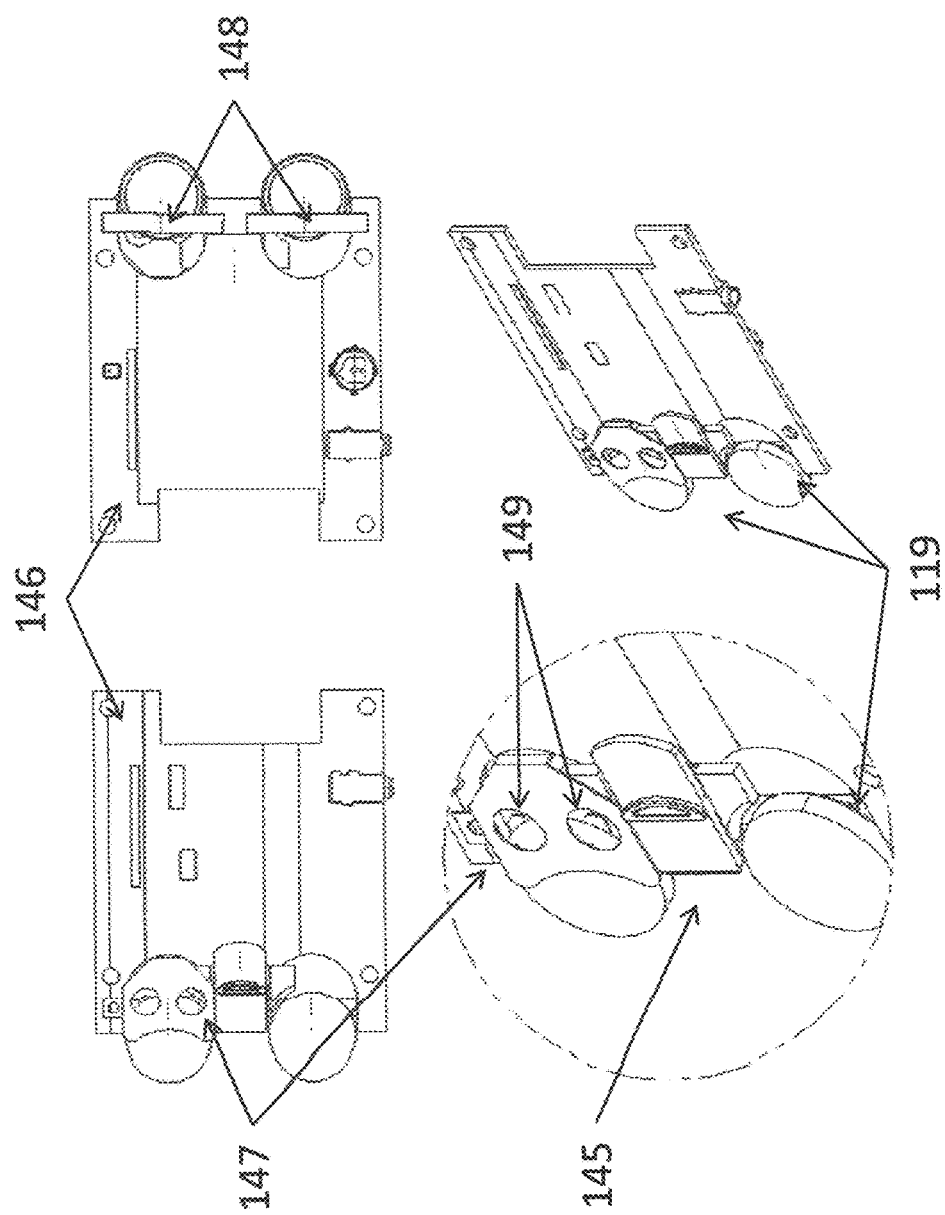
FIG. 7 is a perspective view that shows how batteries can fit into the edge of a printed circuit board (PCB) to save space, along with battery holder elements.

Different types of brackets may be used for dual purposes of holding the batteries 119 in place as well as for acting as conductor as shown in FIG. 7. In some embodiments, the batteries and/or capacitors 119 may occupy less space by cutting or forming a printed circuit board (PCB) 146 to achieve a lower profile. Battery holders 147 and/or one or more brackets 148 may be used to extend across all or a portion of the radius of the batteries to sandwich the batteries 119 and hold them in place while providing electrical connectivity to conductive paths on the PCB 146. The battery holders may comprise one or more "teeth" or depressions 149 to help hold the batteries 119 in place.

Figure 8:
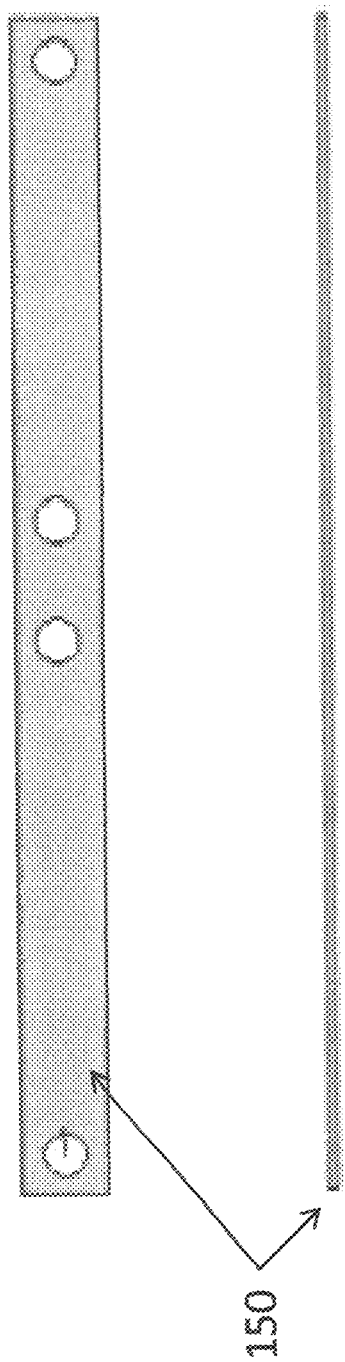
FIG. 8 describes a long straight bracket conductive battery holder.
Figure 9:
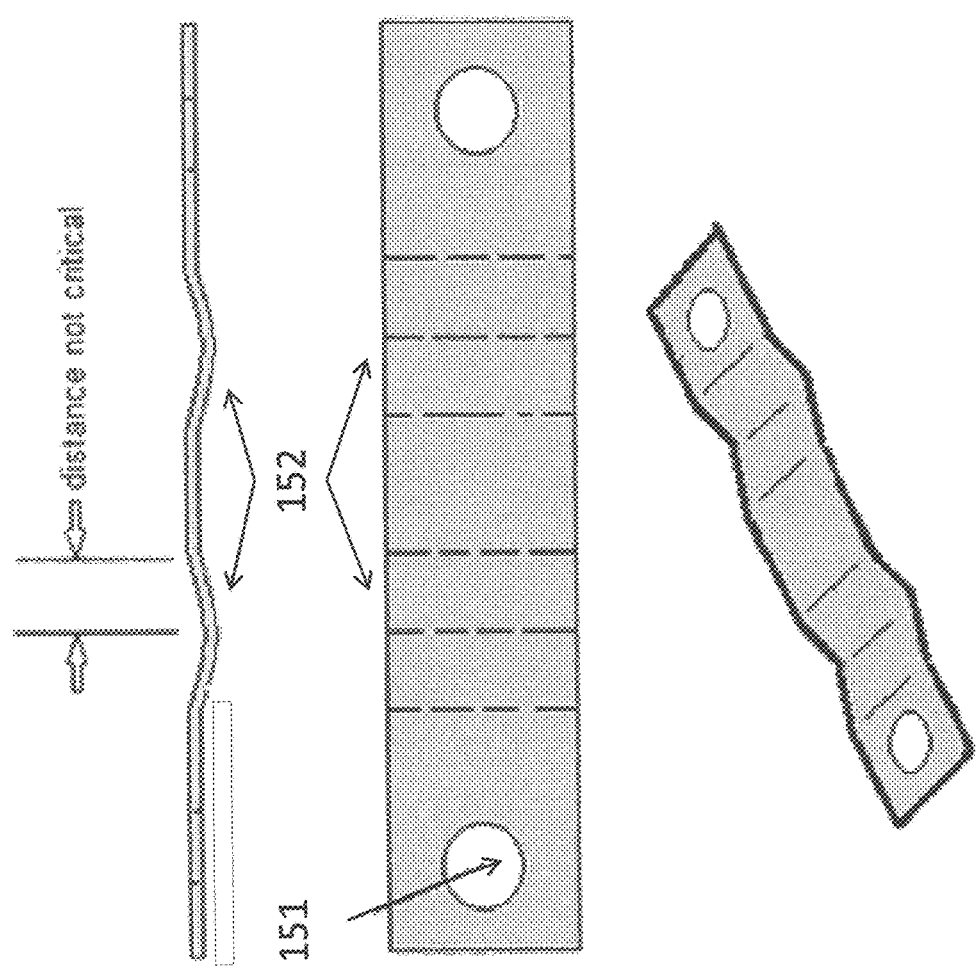
FIG. 9 is a view of a conductive battery holder consisting of a straight bracket with triangular bends formed therein.

The brackets 148 may comprise two pieces to support multiple batteries 119 as shown in FIG. 7, or a single bracket 150 may be used as shown in FIG. 8. A single bracket 150 may also have holes 151 and/or indentions 152, as shown in FIG. 9.

Figure 10:
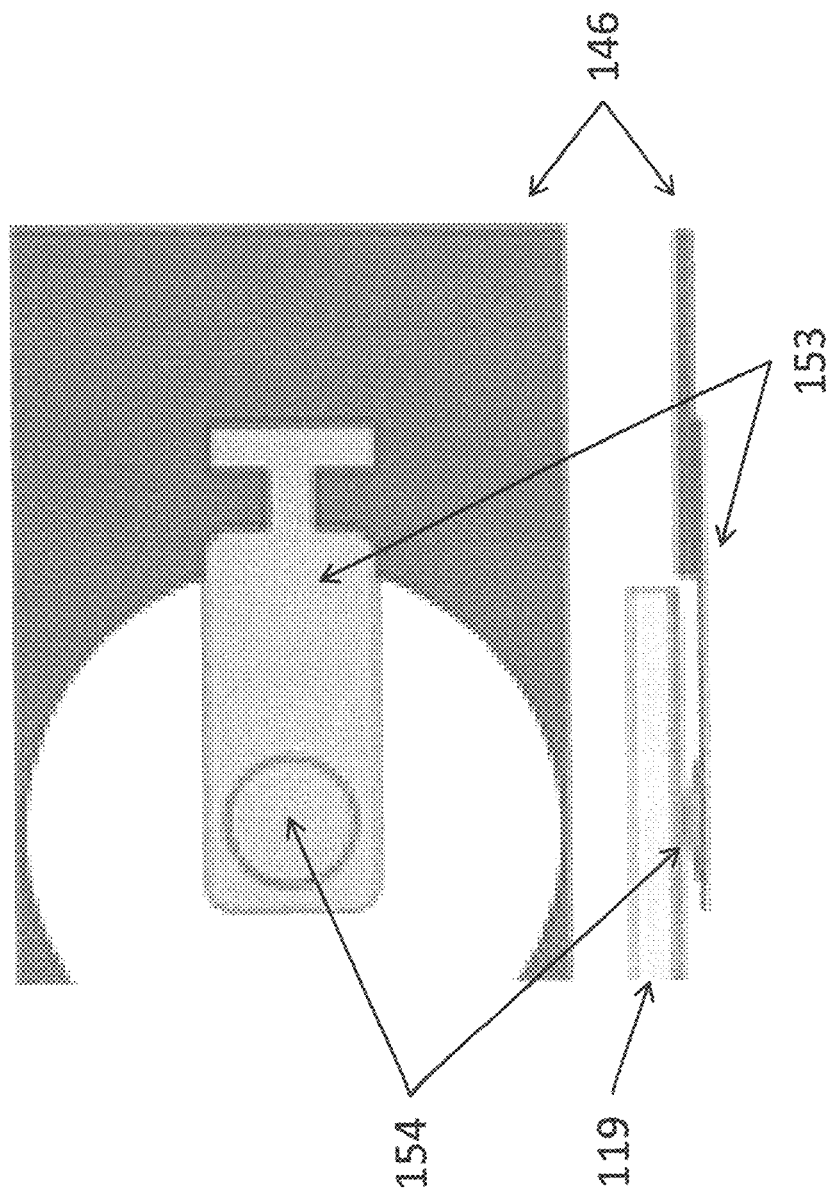
FIG. 10 illustrates a conductive battery holder with a short single straight bracket that holds the coin battery in place.

In another embodiment, a bracket 153 may simply extend from the PCB 146 to engage a battery 119 as shown in FIG. 10. In this embodiment, the bracket 153 may define a dimple or indention 154 to engage the battery 119.

Figure 11:
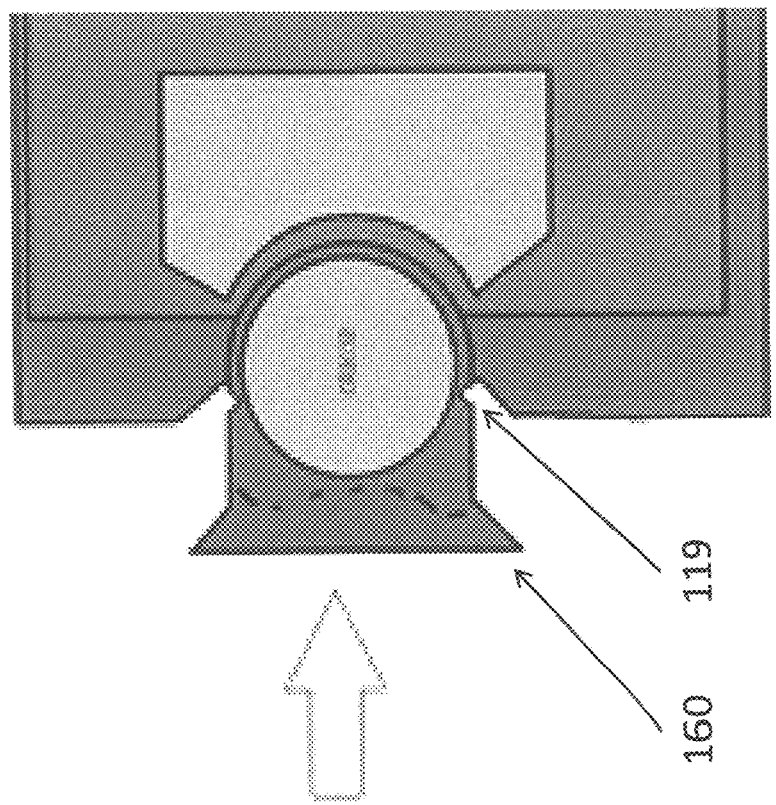
FIG. 11 shows a view of a container or battery holder that holds a coin battery.

In yet another embodiment, a coin battery may be held in place by an enclosure 160, that acts as a carrier for the battery 119, to be inserted and removed as pictured in FIG. 11. A variation of a coin mount utilizes one or more dimples or teeth for contacting the battery 119.

Alternative components and techniques that can be used to power electronics within a smart wallet include super capacitors. Super capacitors or batteries can support energy harvesting techniques including but not limited to piezoelectric devices, solar, thermal, sound, RF and accelerometers.

In one method and system of the present invention the power source or super capacitor of the smart wallet may be charged by means of the using power from a separate device. In such embodiments, power may be obtained through methods including but not limited to inductive charging and/or signal harvesting such as but not limited to RF harvesting. As a non-limiting example, a user may charge the batteries or super capacitor of a smart wallet by placing it in the same pocket as a cell phone (inductive). In yet another non-limiting example, a user may charge a smart wallet by placing it, in one pocket and a smart phone in another pocket (RF harvesting). Under one embodiment, a smart wallet or a component thereof or related thereto may be charged by means of one or more devices, and then "switch" to charging by means of one or more other devices. Switching may be activated by non-limiting, efficiency-determining variables including proximity.

Figure 12:
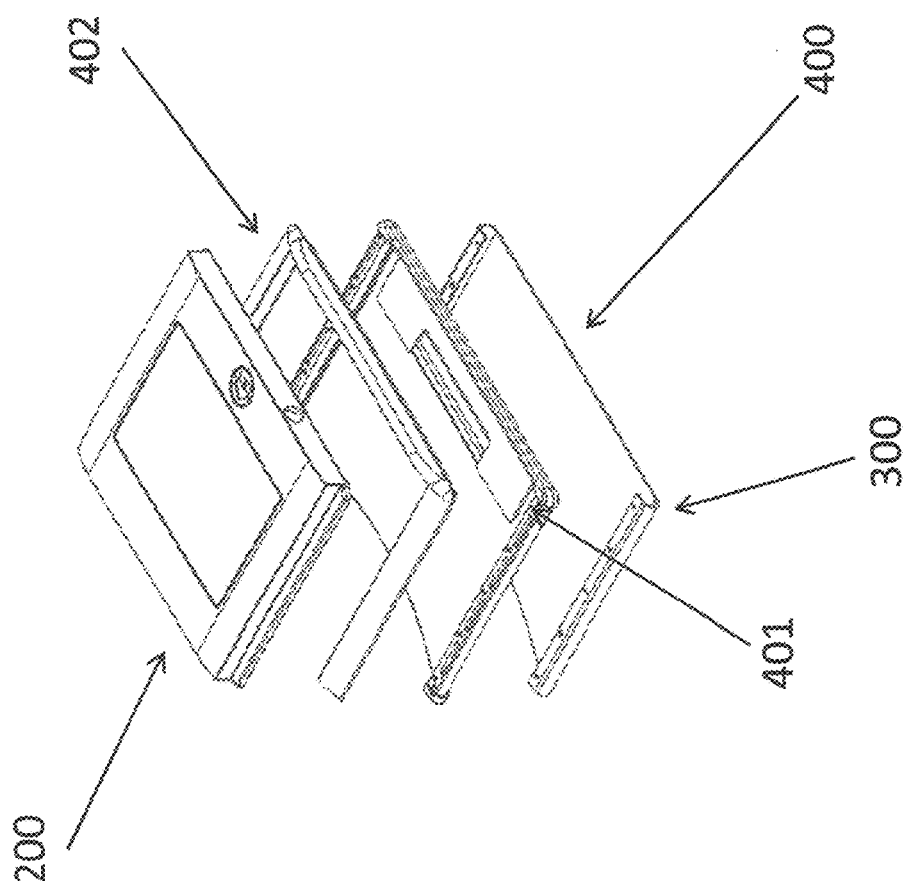
FIG. 12 illustrates an exploded view of an electronics enclosure, accessory mount, optional bezel and material backing.

In some methods of the present invention, users may interchange accessories 400 (see FIG. 12) for use with an electronic apparatus or enclosure 200 by replacing an accessory 400 attached to a mounting device heretofore called an "accessory mount" 401 with or without a bezel or cover 402 as shown in FIG. 12.

Figure 13:
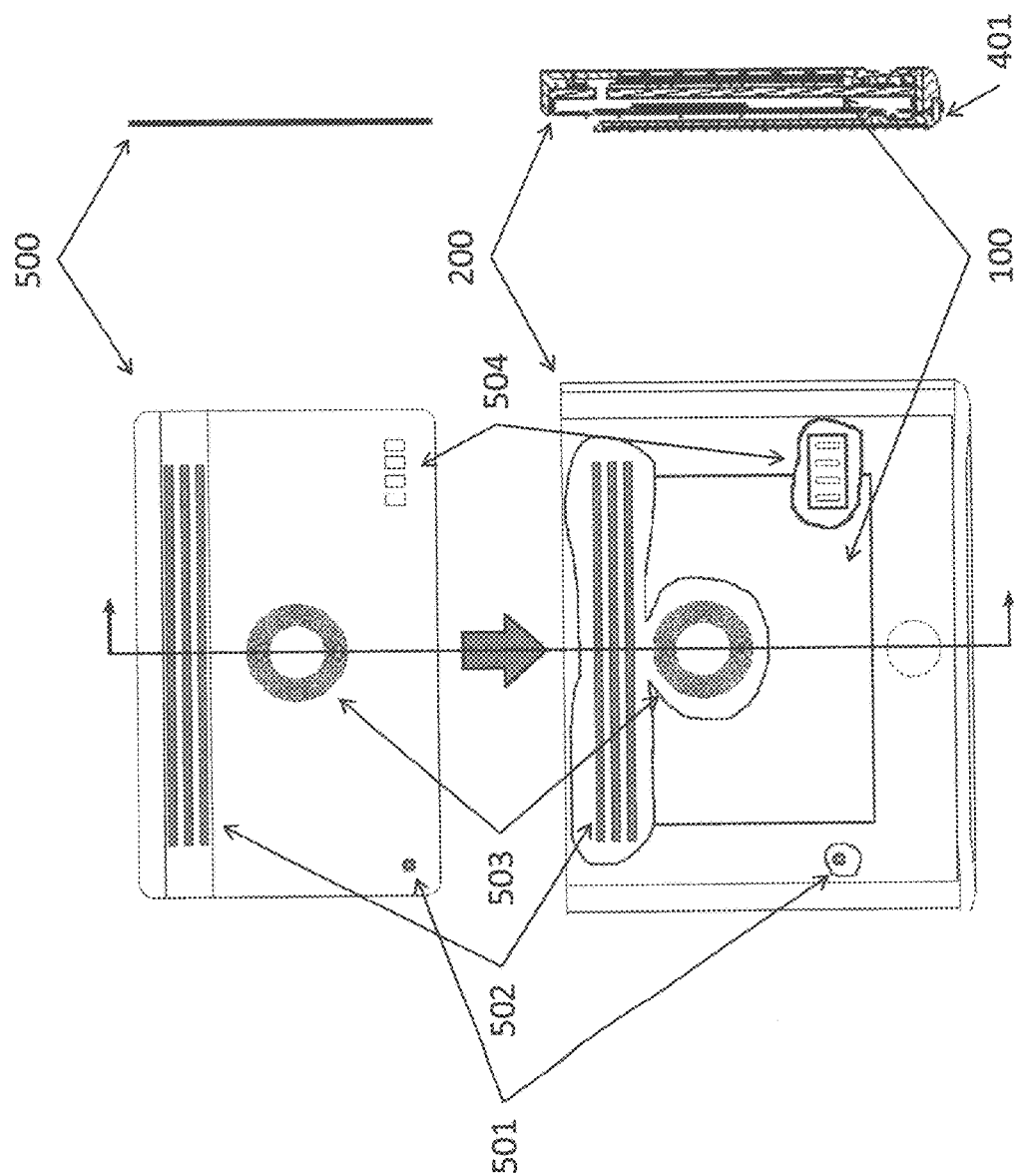
FIG. 13 illustrates how electronics such as but not limited to various charging coils, contacts, antenna, multipurpose inductive/magnetic/RF antenna and/or physical contacts within a separate accessory such as but not limited to a powered card can be aligned to electronics within a smart wallet.

An "accessory mount" 401 is an apparatus that governs how the accessories 400 are physically attached to or interact with electronics 100 within the electronic apparatus or enclosure 200. In one embodiment the accessory mount 401 governs the location of a powered card 500 (such as a powered transaction card), one non-limiting example of an accessory, relative to the electronics 100 or electronic enclosure 200 as shown in FIG. 13. The upper drawing in FIG. 13 illustrates a powered card 500 while the lower drawing in FIG. 13 illustrates the powered card 500 inserted within the electronic apparatus or enclosure 200.

In such embodiments, emitting and/or receiving devices such as but not limited to one or more antennas 501, multi-purpose electromagnet antennas 502, coils 503 and/or contacts 504 within a powered card 500 (or within another accessory) can be aligned to other antennas 501, coils 502, multi-purpose electromagnet antennas 502 and/or contacts 504 within the electronic apparatus or enclosure 200 by the mechanical design of the accessory mount 401. By aligning electronic components such as but not limited to one or more antennas, multi-purpose electromagnet antennas, coils and/or contacts, inductive, magnetic or RF communications and/or coupling can be achieved between separate electrical devices (including, but not limited to, the card 500 and the electronic apparatus or enclosure 200) to provide a variety of functions including but not limited to wake-up, communications and/or power for recharging of one or more batteries within the card, within the smart wallet, and/or within another accessory.

In the embodiments using physical conductive contacts, spring loaded contacts may be used to provide a better fit for the powered card to an accessory mount 401, where pressure may be applied by the spring contacts to hold the card in place. In some non-limiting embodiments the card may be attached to the smart wallet by magnetic means.

Figure 14:
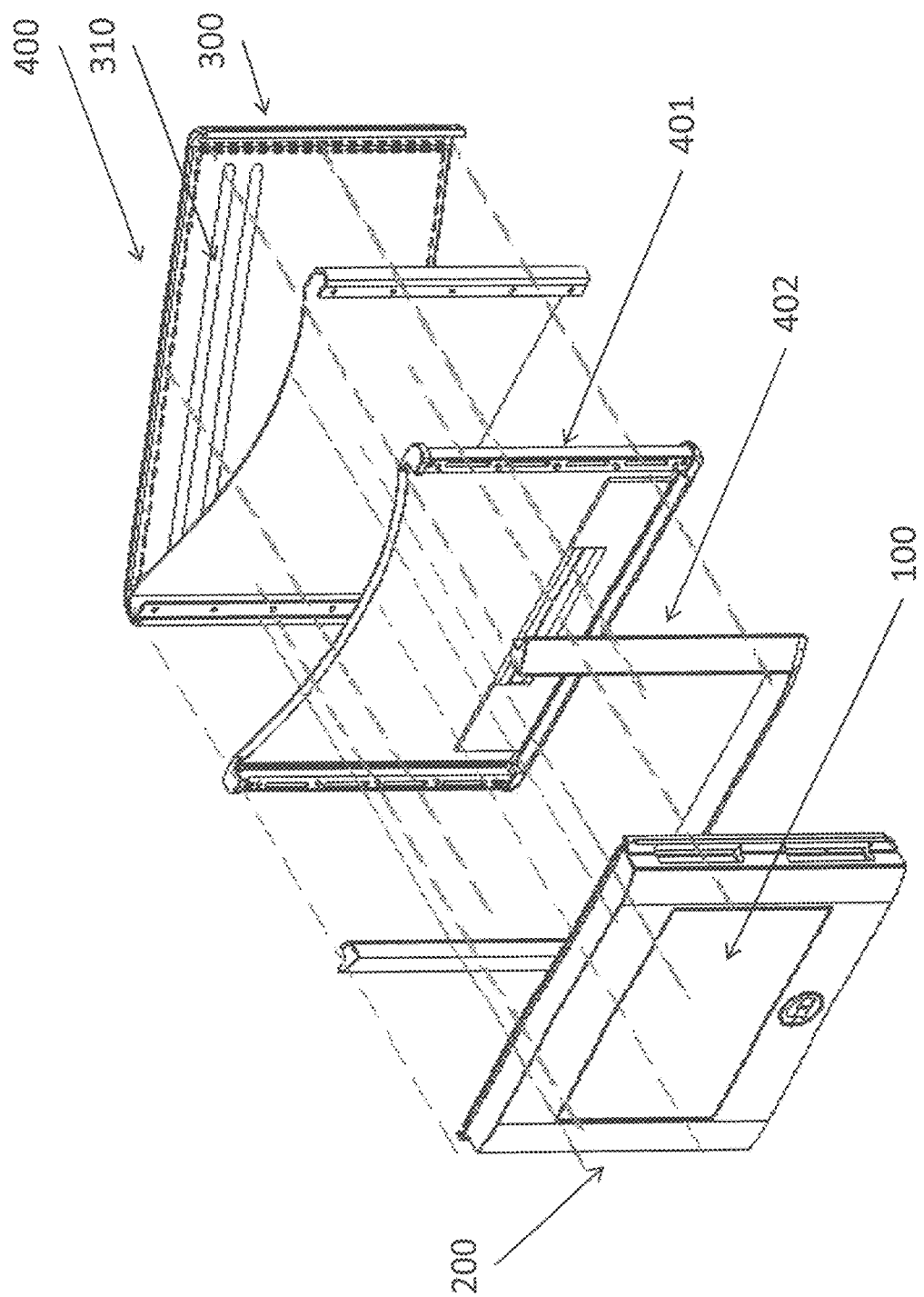
FIG. 14 describes an electronics enclosure with an accessory mount that interlocks with a bezel to trap flexible material to form an accessory with a flap containing two pockets, in this non-limiting example.

An accessory 400 may consist of one or more materials 300, some of which can form pockets 310 or other features such as a cash holder or more pockets 310 as shown in FIG. 14. Under such embodiments, a bezel 402 may capture one or more materials 300 via a bezel 402 to form an accessory 400 that can be attached or removed from an enclosure 200 to form an "accessorized" smart wallet. Those well versed in the art will recognize that the color, style, size and function of the accessory may be changes to include but not limited to the number of pockets for other cards, cash and information.

Figure 15:
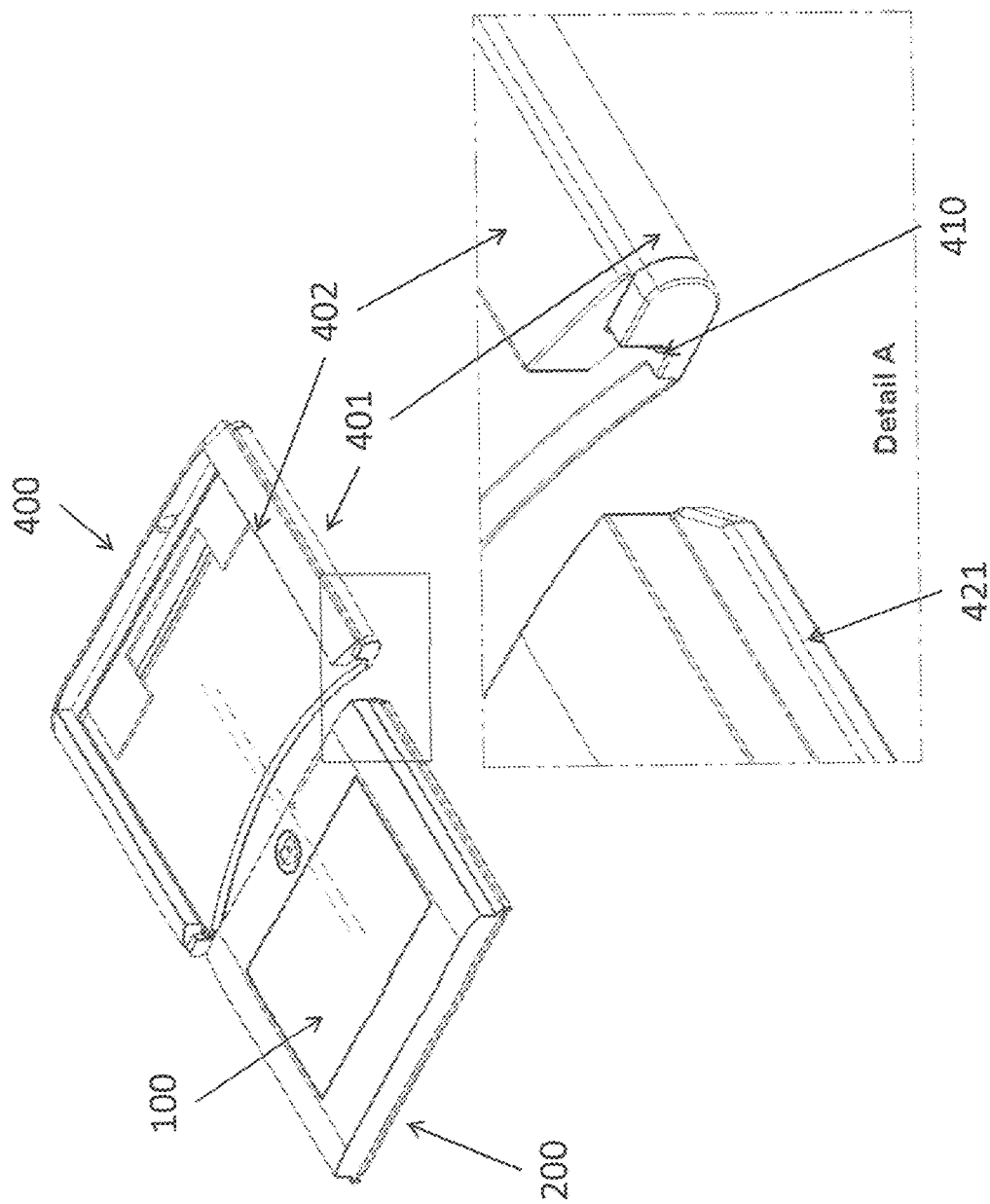
FIG. 15 illustrates a technique to attach an accessory mount to attached accessories to electronics and/or electronic enclosures.

The present invention discloses multiple mechanisms for attaching an accessory mount 401, and thus accessories 400 carried by, secured by or carried within the accessory mount 401 mated with or without a bezel 402, to electronics 100 or its associated enclosure 200 as shown in FIG. 15. Techniques to attach accessories to electronics by operation of the accessory mount 401, include but are not limited to groove, rail-lock techniques, slide-and-lock techniques, and clip techniques.

FIG. 15 illustrates one such technique comprising one or more grooves 410 on each side of the accessory mount 401 and one or more slide protrusions and/or rails (collectively called "protrusions" 421 herein) on each side of the outer enclosure. With this technique, an outer enclosure 200 may be slid or inserted onto the accessories mount 401 with accessory material 300 attached to the accessory mount 401 with or without a bezel 402, to form a smart wallet with optional accessories 400 that vary based on the style and colors of the attached accessory material 300.

Figure 16:
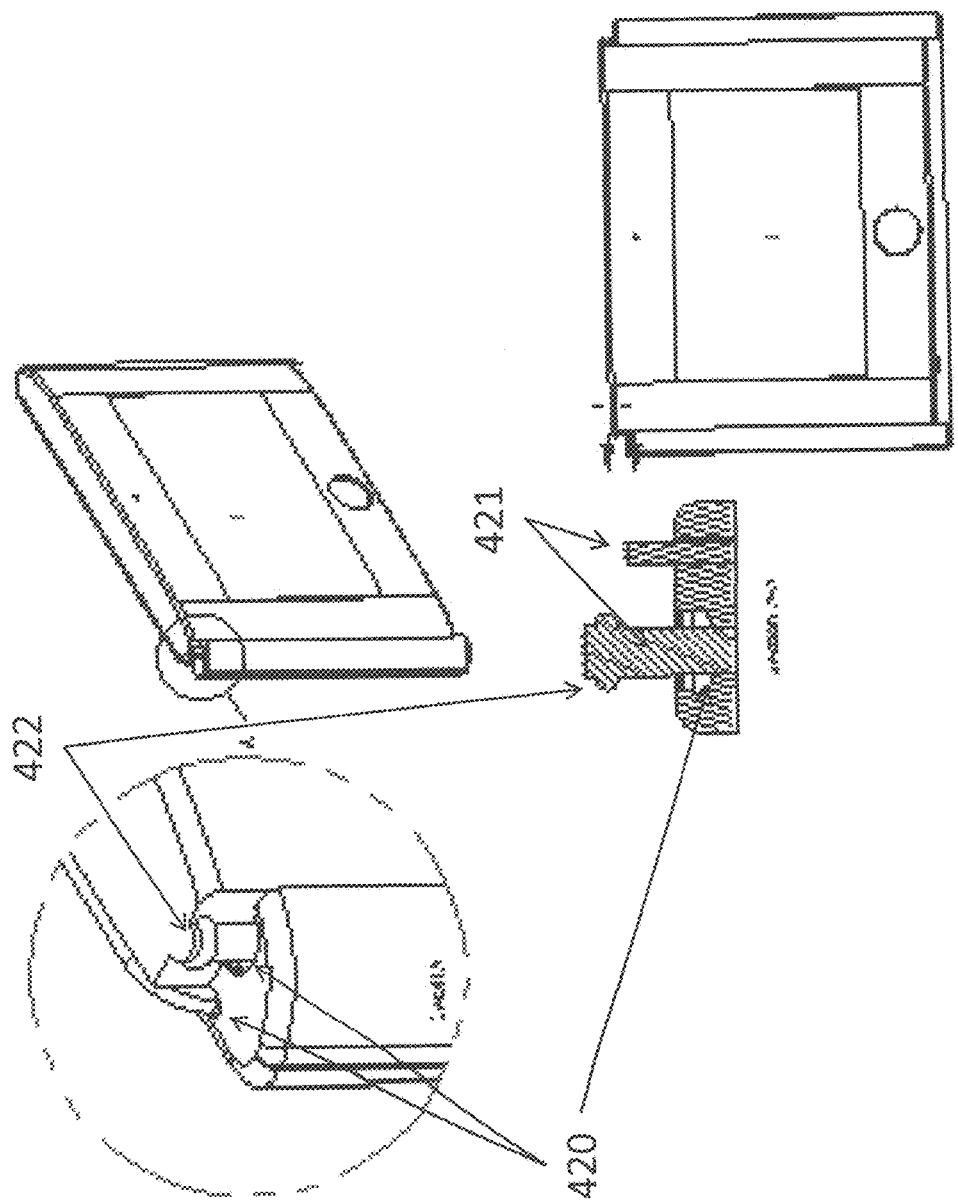
FIG. 16 illustrates a technique to interlock the outer enclosure to an accessory using rails, grooves, protrusions and/or dimples.

FIG. 16 illustrates a similar technique with one or more different style grooves 420 mating with one or more different style protrusions 421 on either side of the electronics enclosure 200. Those skilled in the art will recognize that other sizes and shapes of grooves 420 can support various sizes and shapes of protrusions 421 to support various wallet accessory attachment techniques.

It is further recognized that attachments 400 may also be locked or "latched" into place to form a slide-and-lock technique such as that shown in FIG. 16. These slide-and-lock techniques secure the accessory 400 to the electronics 100 or the enclosure 200 such that neither the accessory 400 nor the electronics 100 or electronics enclosure 200 may separate from each other, but can be easily removed by application of properly directed forces by the user.

One such embodiment achieves a "rail-like" locking mechanism where one or more pegs, dimples (collectively called "dimples" 422 herein) on the protrusion 421 engage one or more cavities within the groove 420 as shown in FIG. 16. According to this embodiment, the one or more dimples 422 along the protrusions 423 on the bottom of the electronics enclosure 200 may have different shapes such as a point, a peg, or a radius such as an arc or semi-sphere. As the protrusions 421 pass through the grooves 420, one or more dimples 422 engage recesses located on the inside flanks of the grooves 420 within the accessories mount 401 causing the outer enclosure 200 to lock into place, thereby securing the electronics 100 and/or electronics enclosure 200 to the accessories mount 401.

Figure 17:
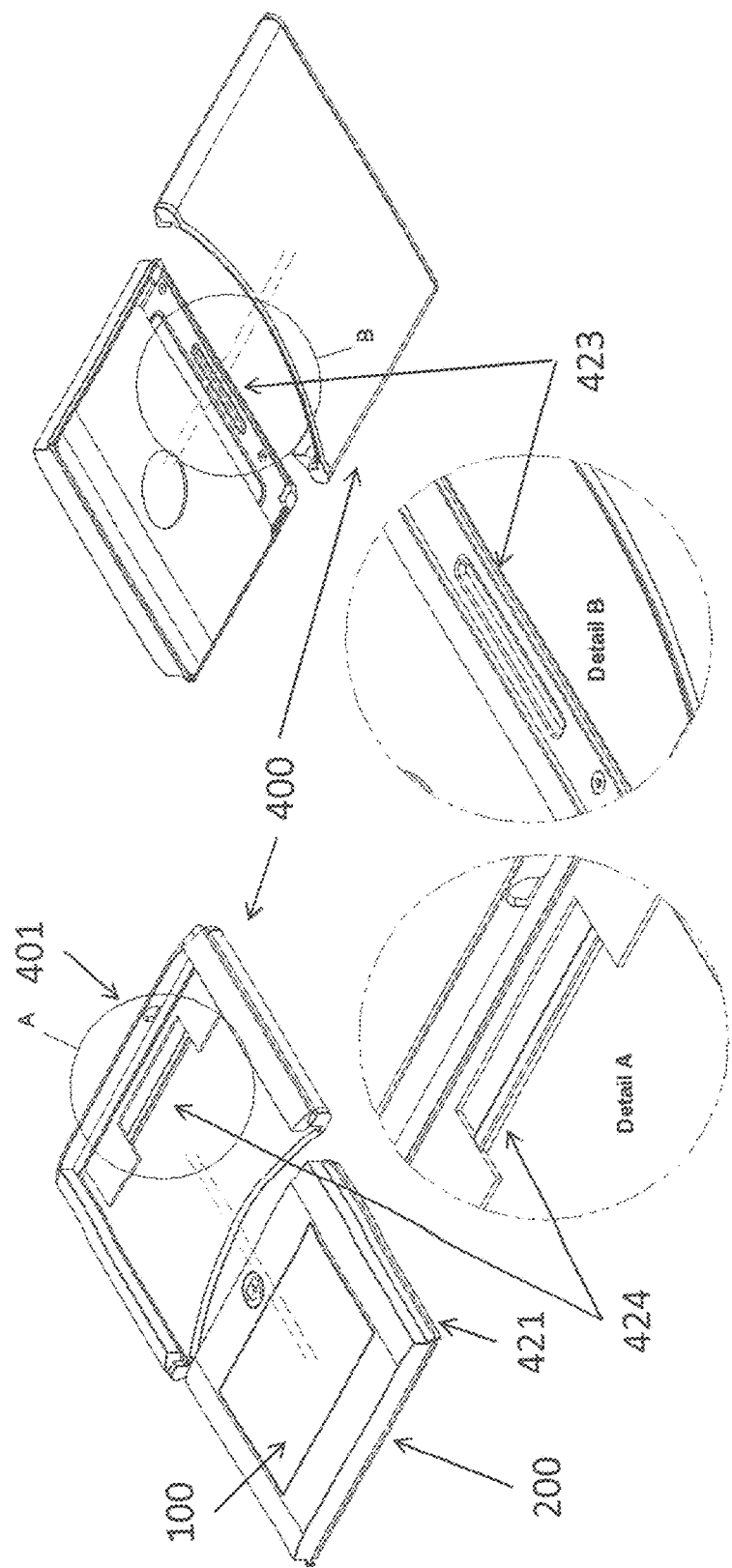
FIG. 17 shows another embodiment that utilizes slide-and-lock elements whereby dimples and recesses are used to interlock accessories to electronics and/or electronic enclosures are not located on the protrusions or rails, but rather on some other part of the body of the electronics enclosure.

Another embodiment utilizes a slide-and-lock technique as shown in FIG. 17 whereby dimples 423 are not located on the protrusions or rails 421, but rather on some other part of the body of the electronics enclosure 200. According to this arrangement, one or more dimples 423 on the rear of the electronics enclosure 200 latches onto one more recesses 424 as shown in FIG. 17 to lock the accessory mount 401 to the electronics 100 within the enclosure 200. An accessory 400 can then be removed and/or replaced by a user simply applying pressure to unsnap the dimple(s) 423 from one or more recesses 424. It is recognized by one versed in the art that other slide-and-lock embodiments may utilize different mechanical mechanisms to "lock" the accessory in place.

Figure 18:
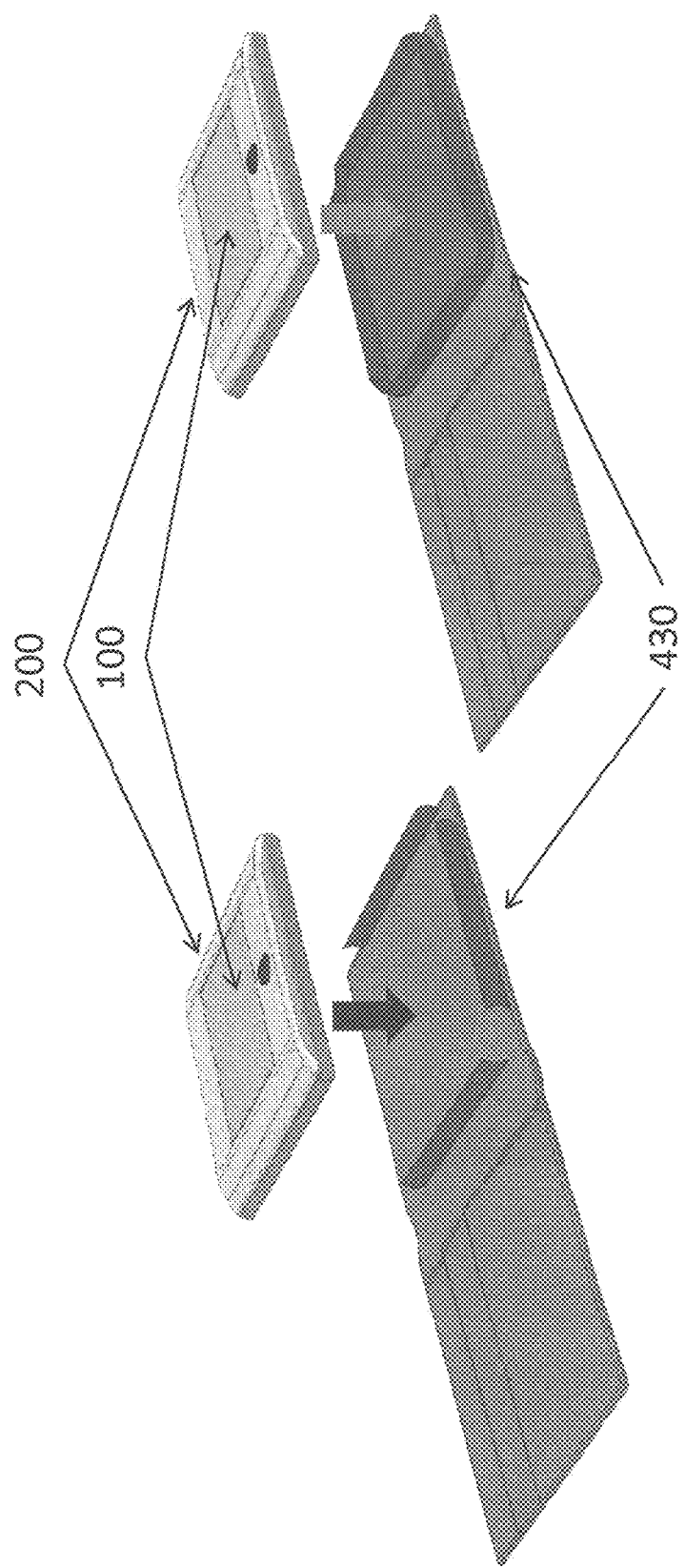
FIG. 18 illustrates two techniques of attaching the outer enclosure to the accessories mount using clips or clasps that apply pressure to the electronics enclosure as the accessory is locked or snapped into place around the main electronics or electronic enclosure.
Figure 19:
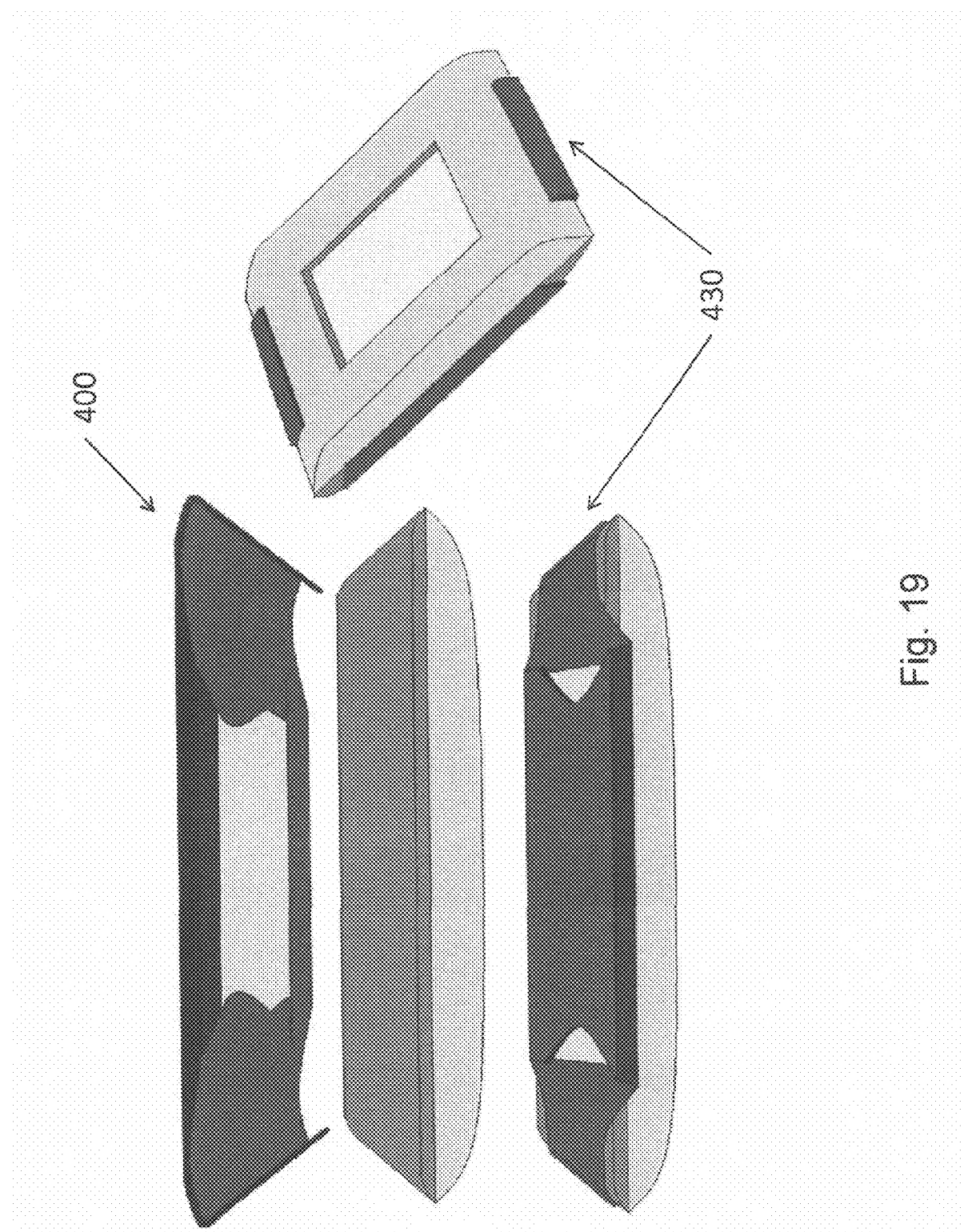
FIG. 19 illustrates clasps may be located at the corners of the accessory, or the sides, or combinations of corners and/or sides around the perimeter of the accessory mount.

Another embodiment utilizes clasps 430 on the accessory mount to attach to the electronics 100 or electronics enclosure 200 using a clip technique as shown in FIG. 18. In this embodiment, clasps 430 apply pressure to the electronics enclosure 200 as the accessory is "snapped" into place. Combinations of corners and/or sides of the accessory mount "lock" or "snap" to the main electronics 100 or electronic enclosure 200 to secure the accessory in place. These clasps 430 may be located at the corners and/or ends of the accessory 400, or the sides, or combinations of corners and/or sides around the perimeter of the accessory as shown in FIG. 19. This technique may be similar to other accessory attachment techniques used with mobile cell phones, but has never been utilized with smart wallet or equivalent wearable configurations.

Figure 20:
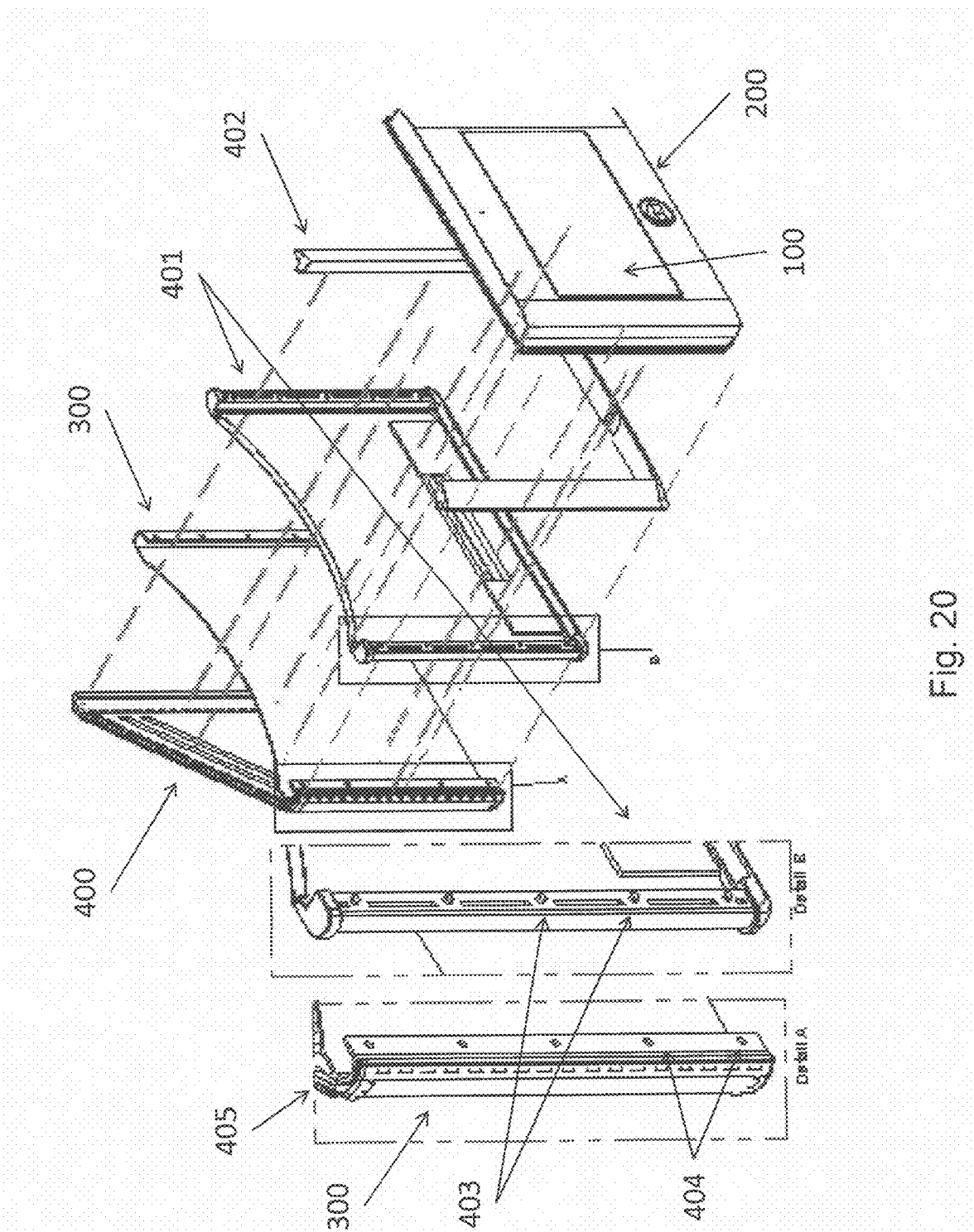
FIG. 20 is a view of how the flexible material is embedded into the accessories mount using pins, holes, and/or glue.

Various techniques may be used to attach material to an accessory. Material may be bonded to the back of the accessory mount by a variety of means including not limited to a bezel technique, hole and latch technique, stitching, spherical groove with pin, spherical groove without pin, and/or sonic welding technique. In one non-limiting embodiment, material 300 wraps around the rear of an accessory mount 401 and is retained in a tight configuration as glue dries by engaging one or more pegs or teeth 403 along a border of the accessory mount 401 as shown in FIG. 20. Alternatively, a groove may be placed within the accessory to absorb excess leather in the assembly process and add strength to the leather. In both embodiments, adhesive 405 is applied to the unfinished side of the material 300 as it is flattened to the accessories mount 401. One or more holes 404 in the material 300 latch onto pegs 403 located on the accessory mount 401, keeping the material tight as material 300 is folded over the back of the accessory mount 401. Materials 300 are then smoothed to the accessories mount 401. Various colors, materials 300 and styles may be added and thus provide multiple accessories 400 that can be added to a smart wallet.

An optional bezel 402 may be attached to the accessory mount 401 to trap material 300 between the bezel 402 and the accessory mount 401 to form a separate accessory module. Under this embodiment, both sides of the material 300 as shown in FIG. 20 have holes 404 punched into the left/right sides for attachment. This "bezel-technique" utilizes holes 404, pegs 403, glue 405, and a bezel 402 to attach the flexible material 300 to the accessory mount 401.

Figure 21:
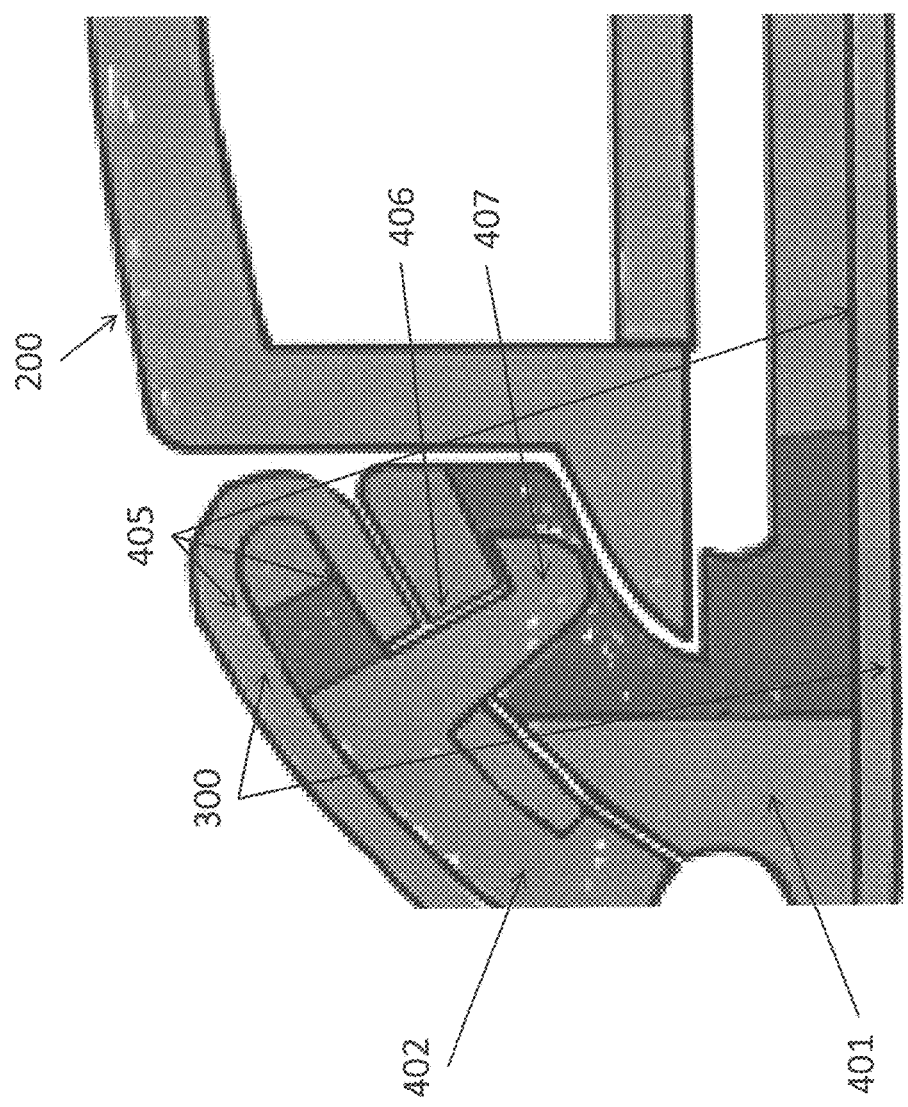
FIG. 21 illustrates components for attaching material to an accessories mount using a latching mechanism that contains one or more holes and one or more pegs and/or hooks.

Another technique uses a latching mechanism between two parts to attach material 300 to the accessory mount 401. Material 300, as viewed in FIG. 21, contains one or more openings 406 for receiving one or more pegs 407, in some embodiments further comprising a hook. According to this "hole and latch" embodiment, material 300 is wrapped around the backside of the accessory mount 401 where one or more pegs 406 are inserted through material 300 and latched into one or more receiving openings 406 on the bottom portion of the accessories mount 401, securing the outer material 300 in place. Glue 405 may also be applied and dried as the material 300 is kept tight.

Figure 22:
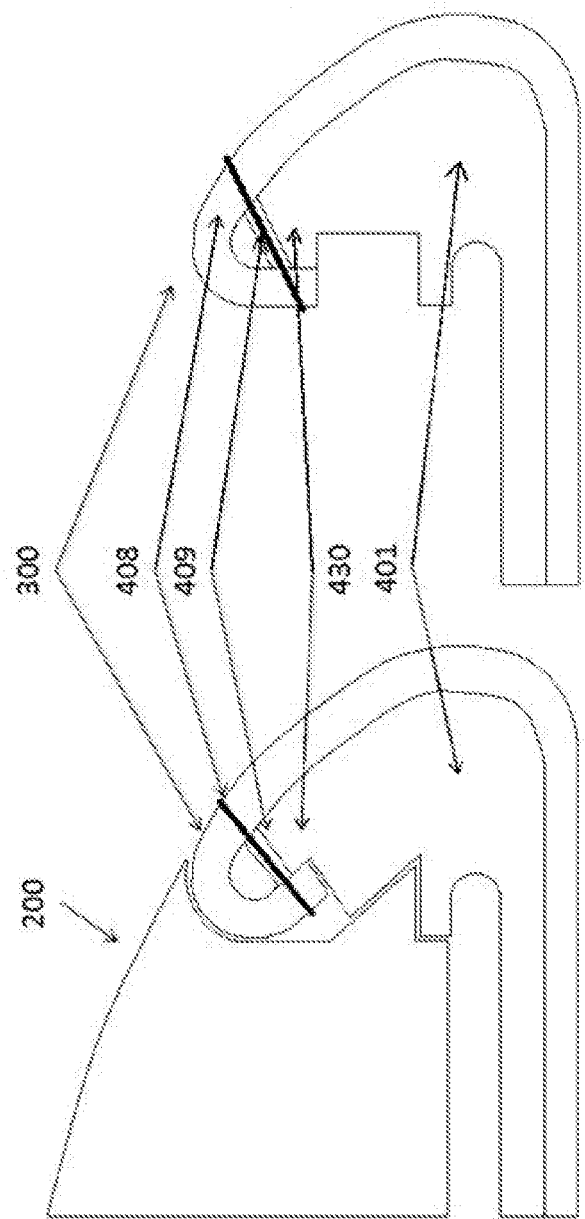
FIG. 22 shows a technique for attaching the outer covering to the accessories mount by means of stitching.

Other techniques use stitching to bond material 300 to the accessory mount 401 are illustrated in FIG. 22. In one embodiment, material 300 is folded over the rear of the accessories mount 401 and then over a tab 430. Stitching 408 is then threaded through one or more holes 409 in the accessory mount 401, securing the outer covering material 300 to the electronic enclosure 200 of the smart wallet.

Figure 23:
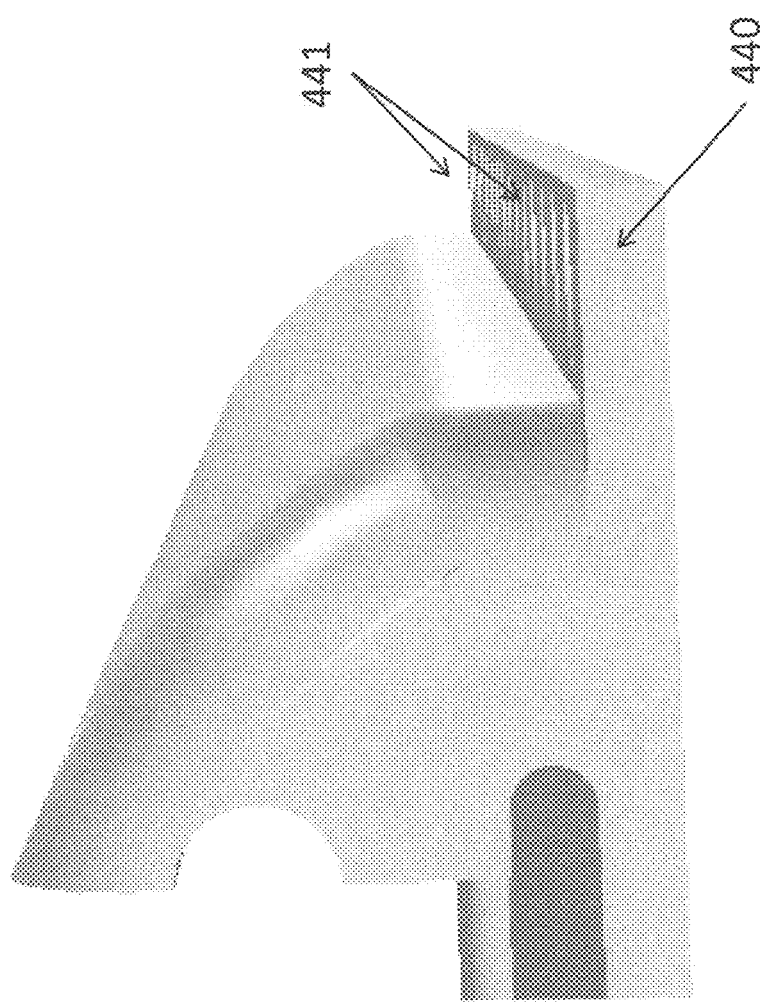
FIG. 23 is a view of how material is attached to an accessory mount using stitching which threads through holes in a tab located on the accessory mount or laminated cover.

In another embodiment, multiple holes 441 are contained in one or more tabs 440 that extend from the edge of the electronics as shown in FIG. 23. Material 300 is folded over tabs 440, with stitching 300 then threaded through the material 300 and through the holes 441, binding the material 300 to the tabs 440 and thus to the electronics. As with other techniques, these techniques can be used in conjunction with glue to secure material 300 to lamination covers and/or other materials that support electronics.

Figure 24:
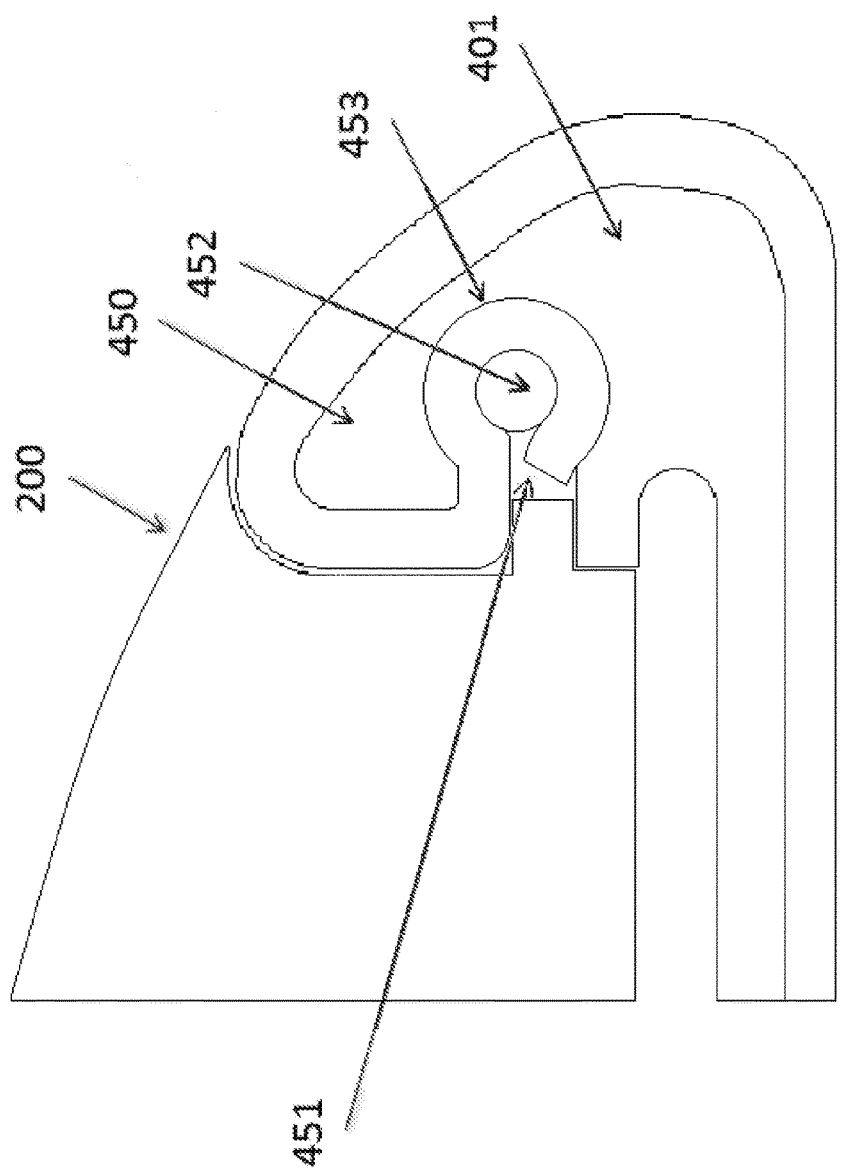
FIG. 24 illustrates how material can be attached to the accessory mount by means of a pin between the fold of the outer covering.

In other embodiments material 300 is bound to an accessory by means of incorporating a groove 451 within the accessories mount 401 as shown FIG. 24. In one embodiment the material 300 is folded over one or more tabs 450 and slid into the groove 451 of the accessories mount 401. A cylindrical pin 452 is wedged between the fold securing the outer covering to the accessories mount 401.

Figure 25:
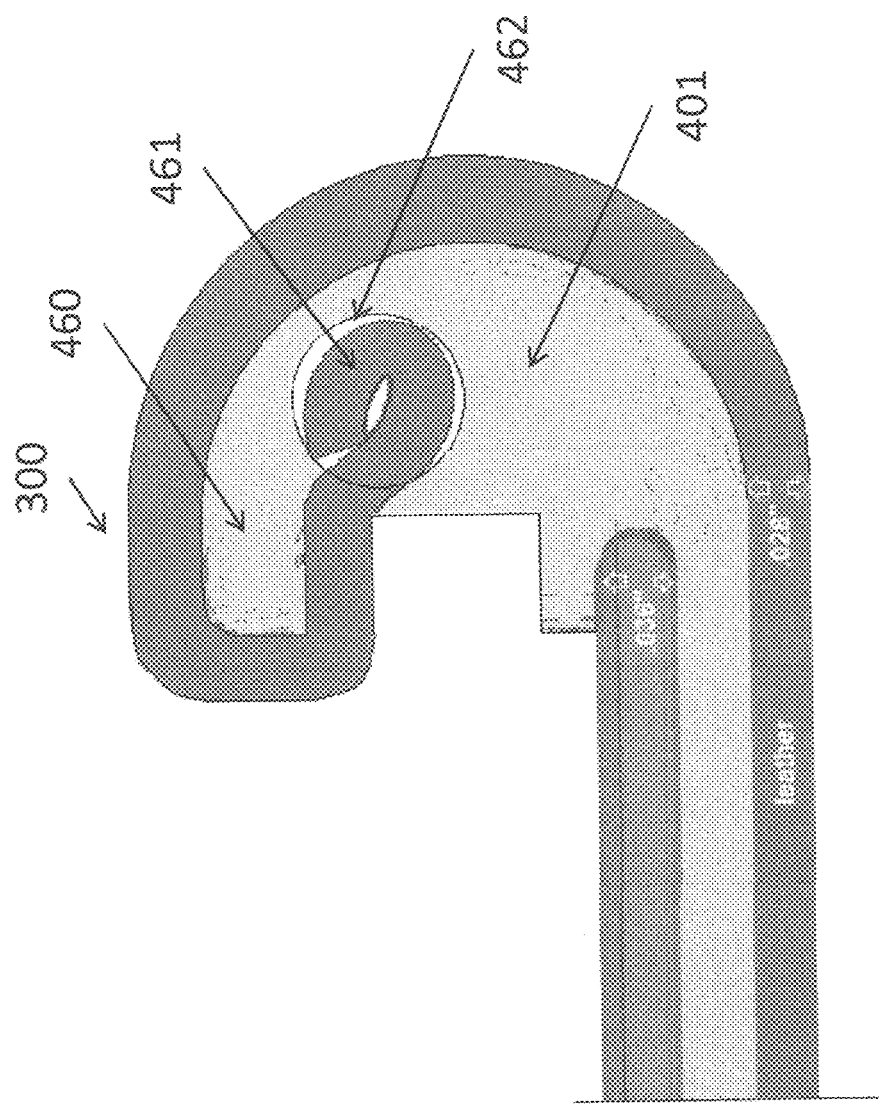
FIG. 25 is a view of how material can be folded over and slid into the accessories mount, which holds it in place.

In another technique illustrated in FIG. 25, material 300 is folded over a tab 460 and rolled into a tubular shape 461. The rolled material 461 is then slid into a groove 462 that holds the material 300 in place. As with other techniques, these techniques can be used in conjunction with glue 405 to secure material 300 to electronics.

Figure 26:
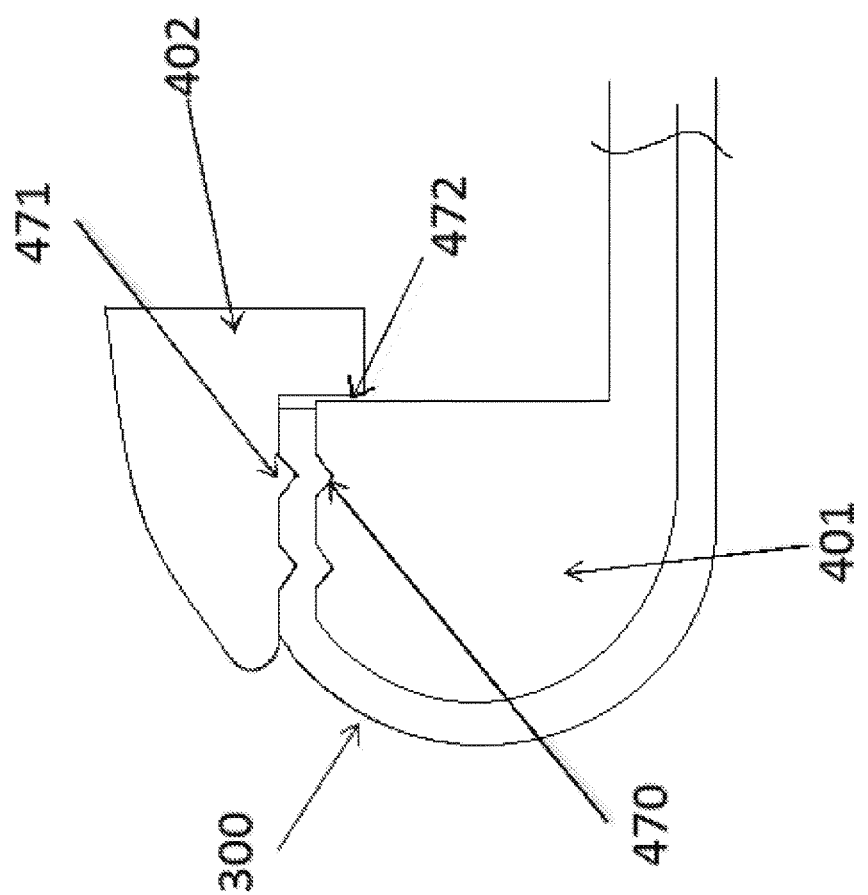
FIGS. 26 and 27 illustrate how one or more materials, such as bezels or covers may be used to press material down into grooves of a second fixture to trap the material using techniques such as, but not limited to, sonic welding or lamination.

Two techniques are disclosed that pinch the material 300. The first uses multiple grooves 470 and teeth 471 on the top and bottom halves of an accessory mount to latch onto the material 300 as illustrated in FIG. 26. At locations where plastic contacts plastic such as at the teeth and other areas, the plastics may be fused using sonic welding as shown by reference numeral 472.

Figure 27:
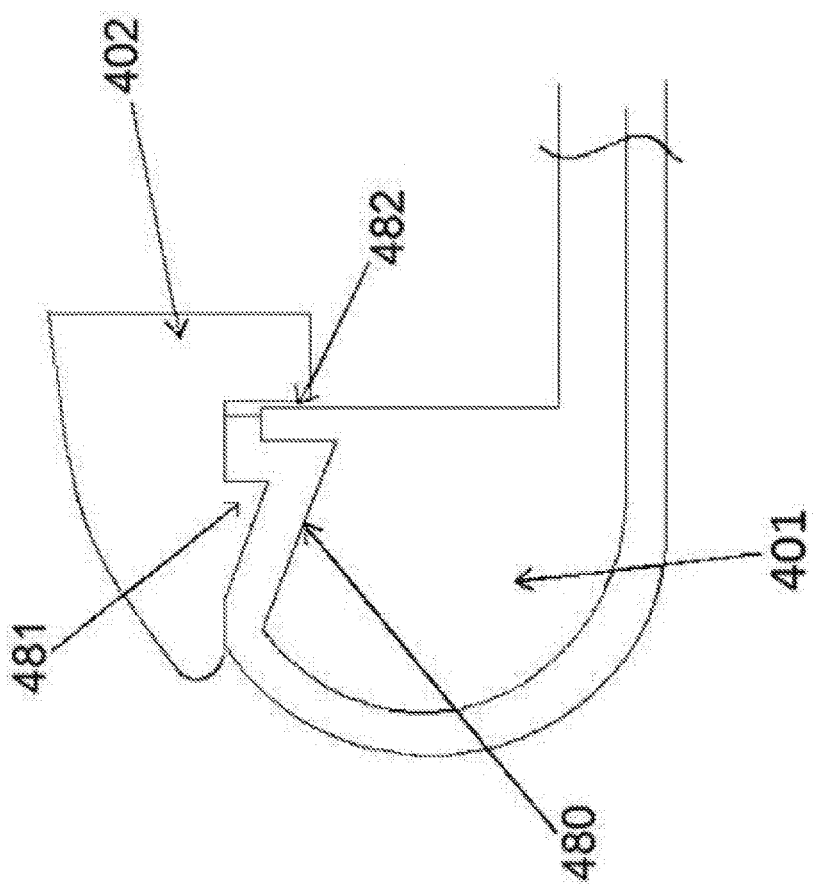

Another technique uses a single triangular groove 480 and tooth 481 to pinch the material 300 as illustrated in FIG. 27. The material 300 is inserted on top of the bottom half of the accessory mount 401. The bezel 402 is then placed on top of the material 300. The two halves of the accessory mount 401 are then bonded using sonic welding with the resulting weld indicated by a reference character 482.

Figure 28:
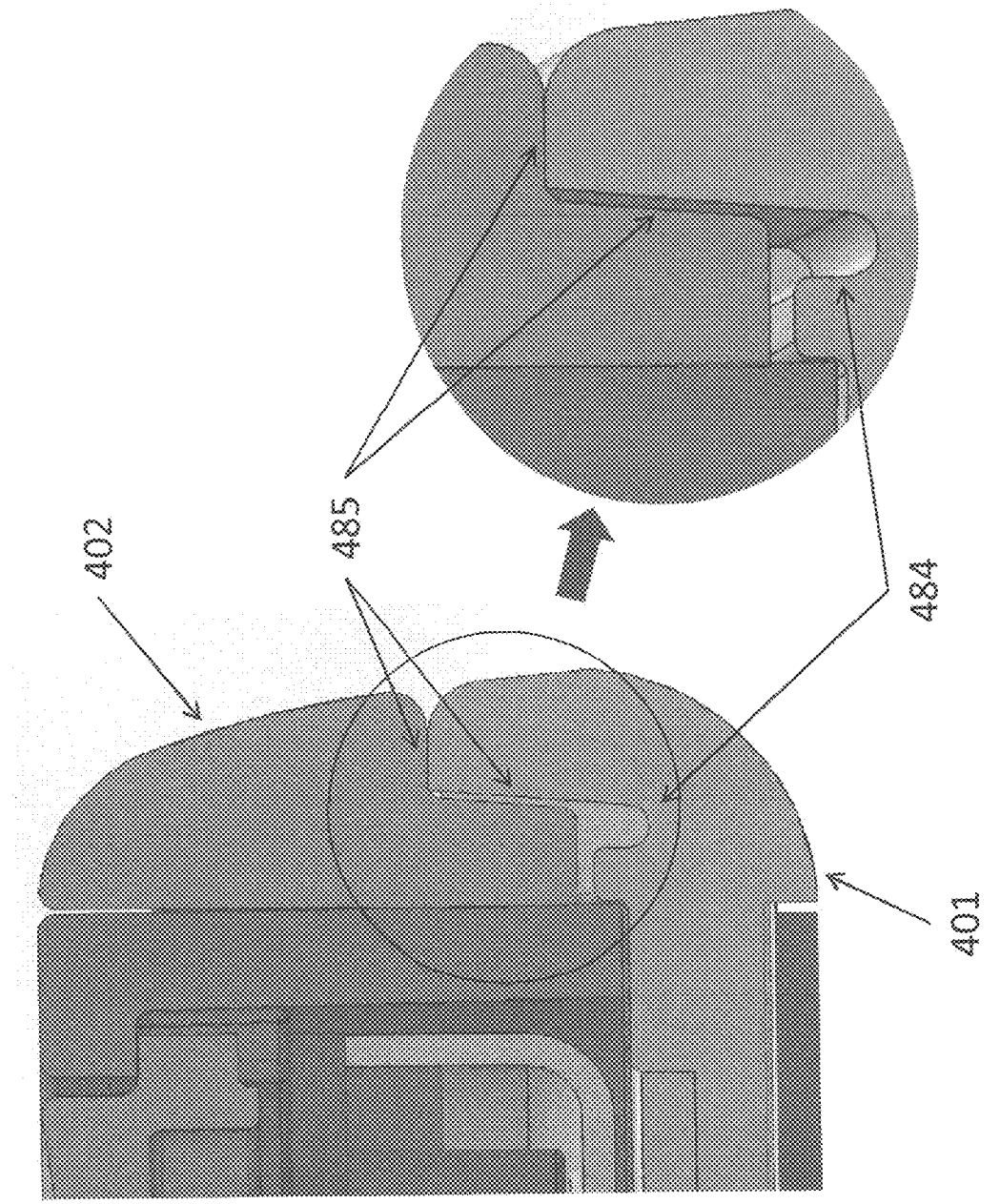
FIG. 28 illustrates glue reservoirs that can be strategically placed to capture excess glue during the accessory manufacturing process.

For any technique that involves adhering material 300 to electronics 100 and/or the electronics enclosure 200, or adhering bezel(s) 402 to accessory mount(s) 401, excess glue on glue surfaces 485 can create problems. This invention addresses this excess glue issue by providing reservoirs 484 for excess glue or adhesives in strategic glue surface locations 485 as shown in FIG. 28.

The present invention also incorporates a technique to align external electronics such as but not limited to an electronic card 500 (such as the card 500 of FIG. 29) so that the smart wallet (in one embodiment comprising the electronics 100 and/or the electronics enclosure 200) to perform various functions including, but not limited to:

- Waking a peripheral device, such as but not limited to an electronic card 500, from a sleep state via inductive, magnetic, and/or RF technique(s)
- Waking a peripheral device, such as but not limited to an electronic card 500, from a fully off "passive" state via inductive, magnetic, and/or RF technique(s)
- Single and/or bi-directional authentication
- Programming the powered card with information such as but not limited to.
  - Name
  - Payment account number
  - Encrypted account number
  - One-time-code and/or token that represents an account number
  - One-time-code and/or token that represents an account number, smart wallet ID and/or personal identity
  - Token
  - Card alias—a name given to the card by the user
  - Payment card type
  - CVC/CVV identifiers (card verification code/card verification value)
  - Insurance information
  - Medical information
  - Password information
  - Authentication information
  - Identification information
  - Gift Card information
  - Loyalty Card information
  - Identification including but not limited to state, country, citizenship, employee, voter, etc.
  - Social Security and other identity information
- Charging of the battery within of a peripheral device, such as but not limited to a powered card 500, by the electronics 100 (such as included within a smart wallet) via inductive transfer technique
- Charging of the battery within a peripheral device, such as but not limited to the powered card 500, by the electronics 100 (such as included with a smart wallet) via RF power transfer technique
- Low power proximity detection and reporting between a powered card and a smart wallet via inductive, magnetic, RF and/or combinations of each technique.

Figure 29:
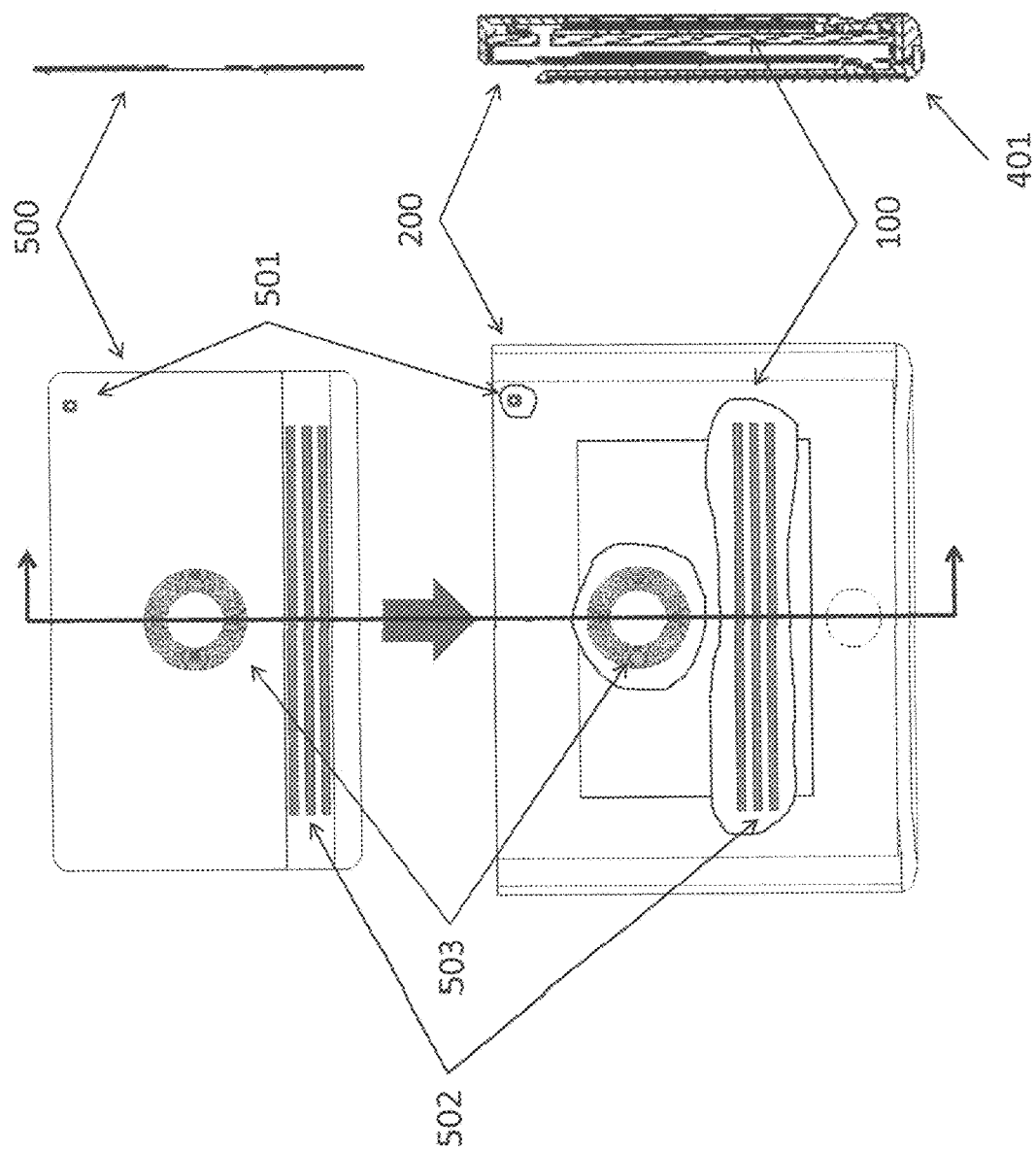
FIG. 29 illustrates unique mechanical configurations to align smart wallet electronics with other devices such that a variety of inductive, magnetic and/or RF (Radio Frequency) communications can be achieved between the devices.

As shown in FIG. 29, the unique mechanical configuration of the accessory and/or accessory mount 401 to the electronics 100 or electronic enclosure 200 provides alignment between the smart wallet electronics 100 and the powered card 500 such that any single component or a combination of components to perform the functions listed above may be achieved between the two devices. These functions may be accomplished via a variety of techniques including inductive, magnetic, and RF (Radio Frequency) communications such as but not limited to one or a combination of Bluetooth, BLE (Bluetooth Low Energy), Wi-Fi, and/or RFID. In some embodiments, a coil 503 within a powered card 500 is aligned with a coil 503 inside the electronics 100 of the smart wallet or the electronic enclosure 200 to provide the wake-up, communications, and/or other features described herein or known to those skilled in the art. In other embodiments, an antenna 501, such as a chip level or small antenna, may be strategically placed on the powered card 500 such that it aligns with the same or similar antenna 501 on the electronics 100 within the smart wallet. Likewise, other embodiments may include a multipurpose magnetic/inductive/RF antenna 502 may be included and aligned between the powered card 500 and the electronics 100 to support one or more multiple functions such as those previously listed herein all with the same antenna(s).

One versed in the art will readily recognize that many smart wallet (e.g., the electronics and/or the electronic enclosure 200) accessory materials, styles and colors can be integrated with the accessory mount to form an accessorized smart wallet, each with its own various currency and cardholder pockets. In many embodiments, the present invention also entails a style for the currency and cardholder as it is attached to an accessory. This style entails a primary material 300 and a secondary flexible material that contains pockets for holding cards and currency. Some embodiments contain holes or openings that latch on to teeth, protrusions, etc. in the accessory.

Figure 30:
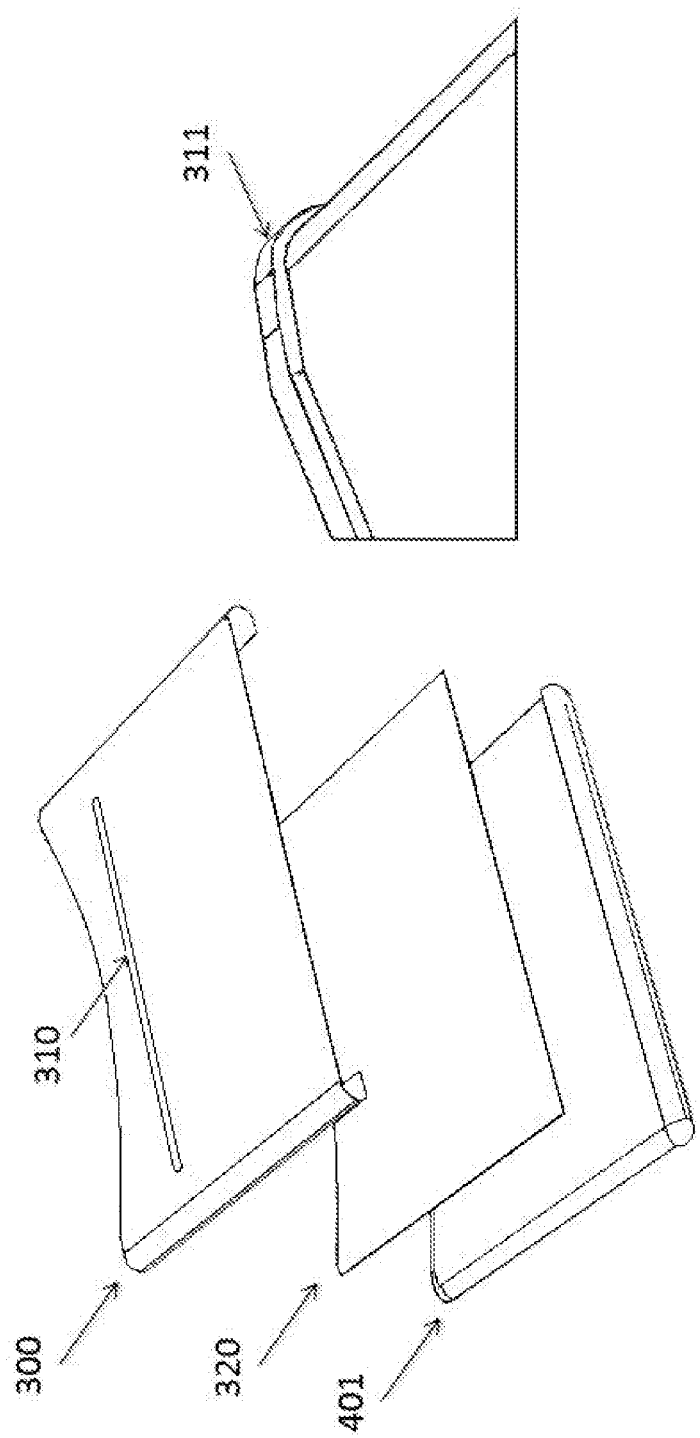
FIG. 30 illustrates a seamless single pocket accessory style comprised in this example of a pocket cut into an outer material with an optional liner that provides a backing for the pocket attached via glue, stitching, a hook and loop fastener or any combination.

One example of an accessory is shown in FIG. 30 illustrating a seamless single pocket style comprised in this example of a pocket 310 cut into an outer material 300 with an optional liner 320 that provides a backing for the pocket 310 attached via glue, stitching, sonic welding, bonding, a hook and loop fastener, or any combination as non-limiting examples. In this example the liner 320 is positioned between the material 300 and in a slight recess 311 Along the border of an accessory mount.

Figure 31:
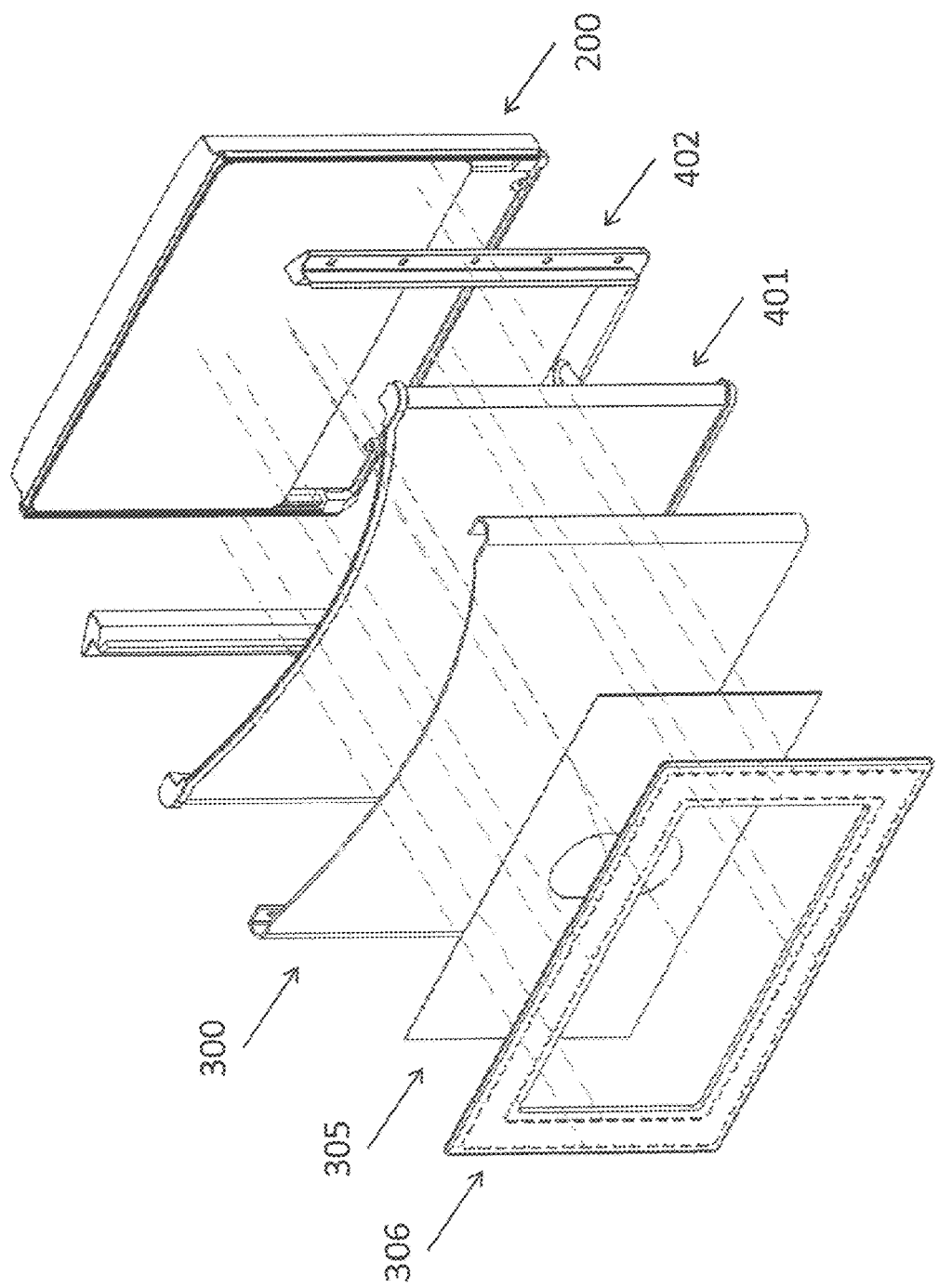
FIG. 31 illustrates another single pocket technique that consists of a clear window, but with outer material stitched to base material 300 to form a clear pocket to show cards such as an identity card or license without opening the wallet.

Likewise, FIG. 31 describes another single pocket technique that consists of a clear window 305, but with outer material 306 stitched to base material 300 to form a clear pocket to show cards such as an identity card or a license. In this embodiment, the currency and cardholder as attached to the electronic portion of the smart wallet, entails material 300 which wraps around the accessories mount 401 and attaches using holes in the flexible material 300 and teeth and/or grooves in the accessories mount 401 that line up with holes in the bezel 402.

Figure 32:
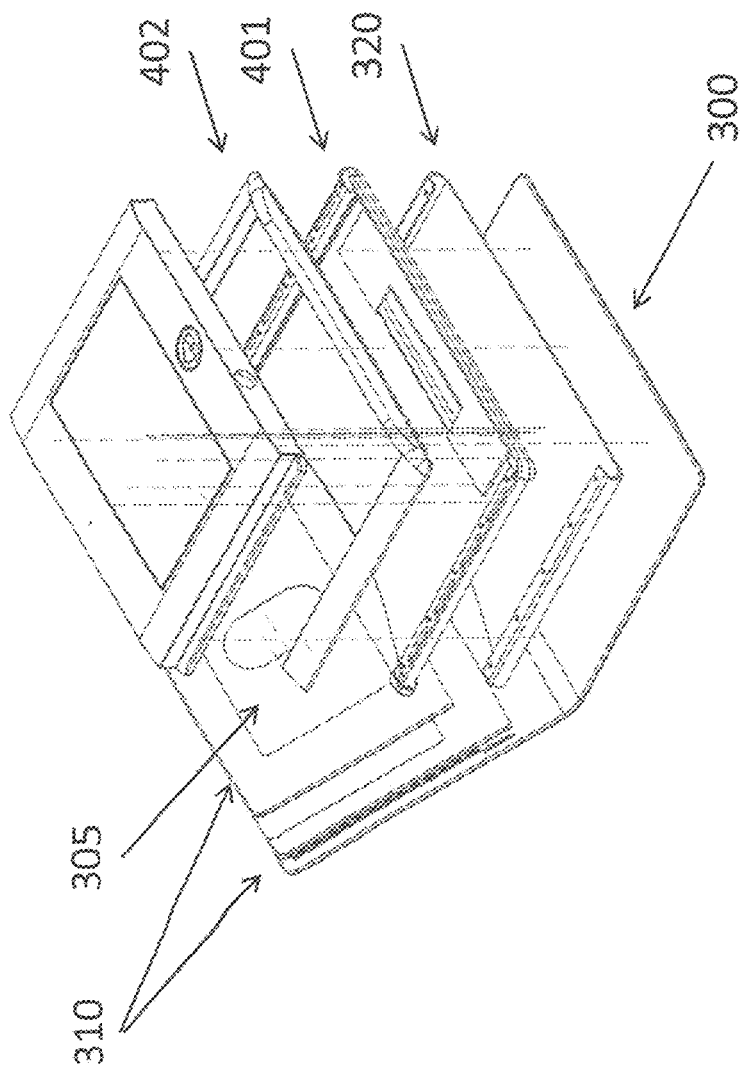
FIG. 32 illustrates a top-fold accessory technique comprising of one or more material pockets and/or ID pockets made of material as they are attached to an accessory mount that attaches to electronics or electronic enclosures.

FIG. 32 illustrates another currency and card style for attachment with the accessories mount 401. In this embodiment, material 300 is folded over the top to achieve a "top fold" style with one or more pockets 310 for cash and/or cards. The material 300 wraps around the sides of the accessory mount 401 and is bonded directly to the accessory and/or accessory mount 401, or is alternatively attached to a filler material 320 via multiple means such as glue, bonding, stitching, or a hook and loop fastener. One or more pockets 310 are attached to the back dual flap made of flexible material via multiple non-limiting means including glue or stitching. One of the pockets 310 can also consist of a clear plastic covering 305.

Figure 33:
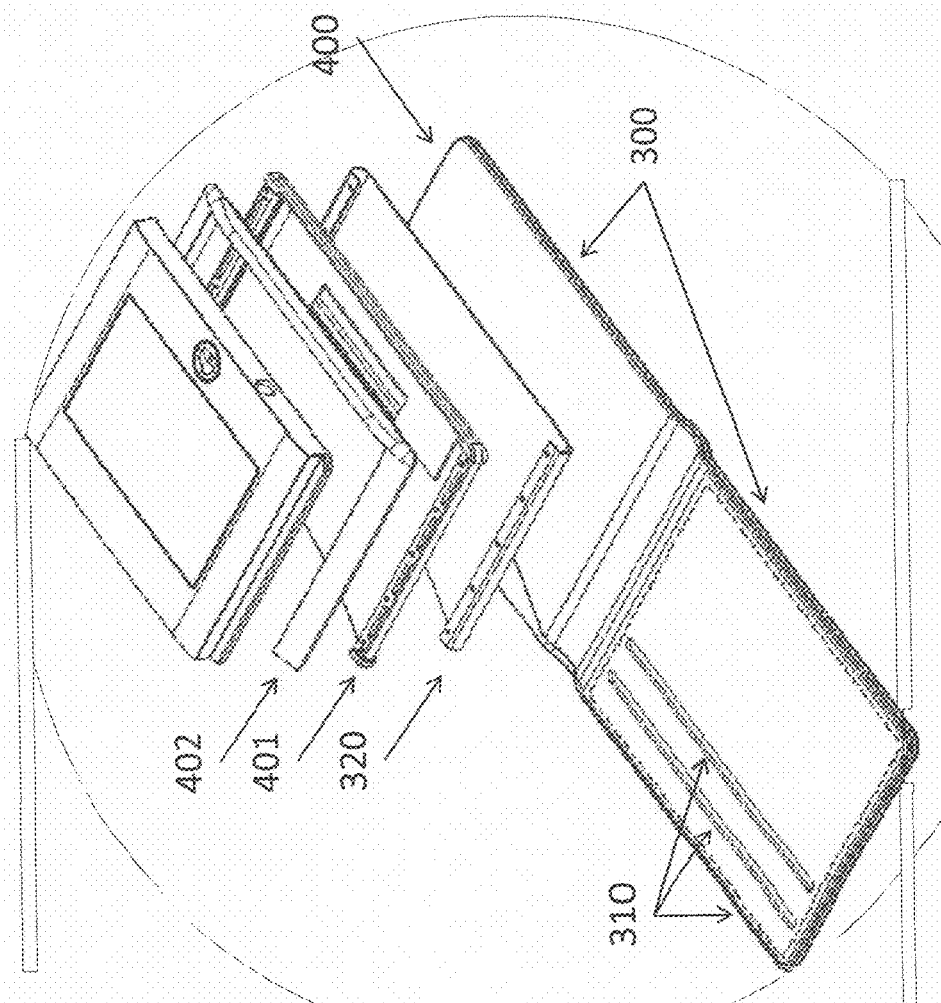
FIG. 33 illustrates a non-limiting example of a side-fold accessory comprising of two card slots attached to a currency pocket.

Another currency and cardholder style embodies material 300 that is wide enough to fold over from a side to form a "side-fold" style smart wallet accessory such as in FIG. 33. Outer material 300 wraps around and attaches to an accessory mount 401 via means including, but not limited to glue, bonding, welding, stitching and/or a hook and loop fastener. Holes in the material 300 may also engage pegs in the accessory mount 401 and also be captured by a bezel 402, or glued, bonded, welded, stitched and/or attached via a hook and loop fastener to an optional filler 320. One or more pockets 310 can be added to the top seam, similar to a partial or full cash pocket or card pockets on the inside or outside of the accessory 400.

Figure 34:
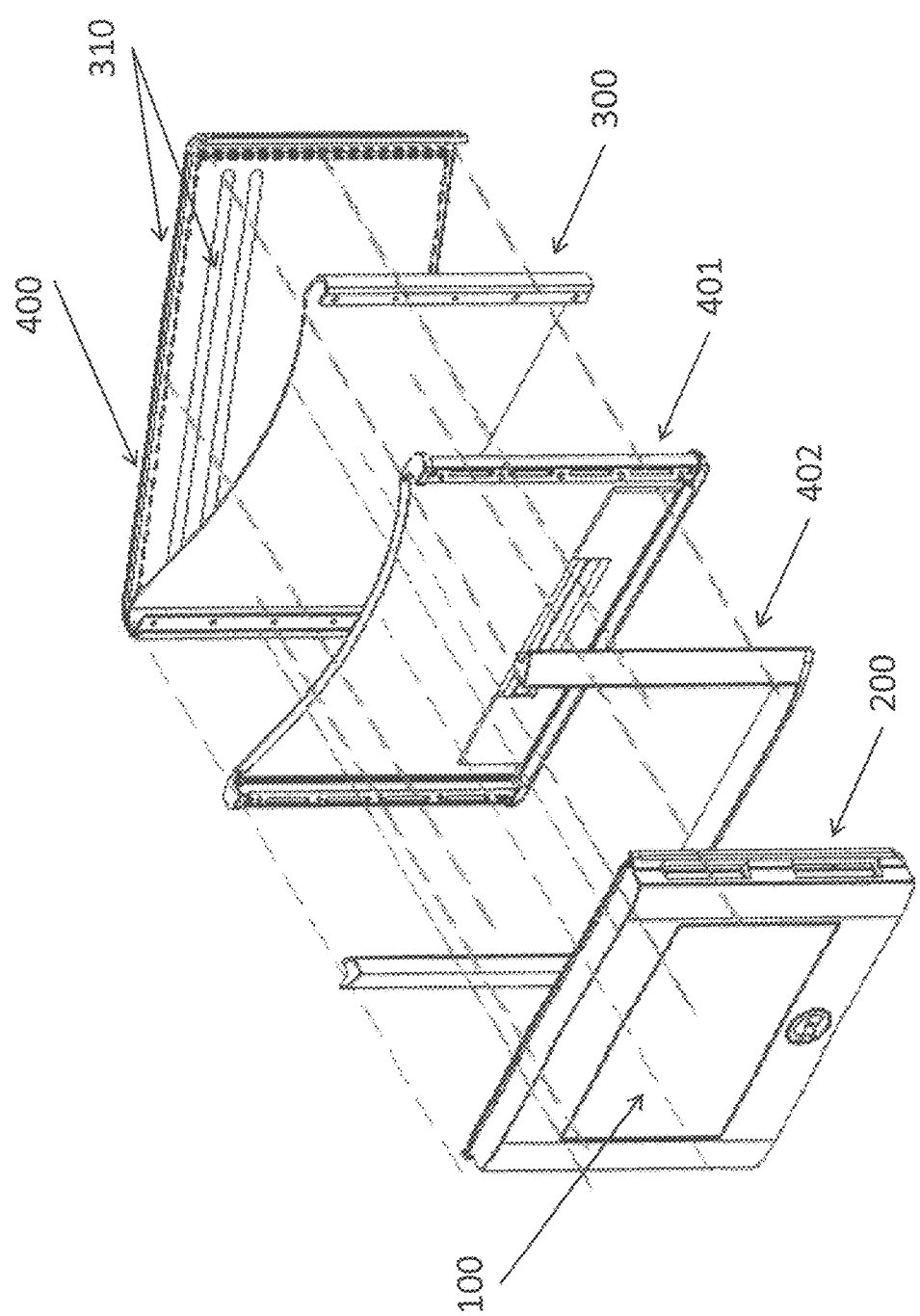
FIG. 34 illustrates a back-fold style where material 300 with pockets in the seam and/or outer and/or inner sides.

Yet another embodiment consists of a "back fold" style where material 300 with pockets 310 in the seam and/or outer and/or inner sides as shown in FIG. 34. Material 300 wraps around and engages pegs or teeth in the accessory mount 401, and is bonded via glue, stitching and/or a hook and loop fastener. Material may also be captured by an optional bezel. Material then folds back to achieve the "back-fold" style of the accessory 400. Variations in this embodiment include a clip at one end of the outer flap of the material to keep the back material in place as it engages the electronic enclosure 200 and/or electronics 100.

Other accessory styles include but are not limited to variations in materials, sizes, attachment techniques, colors, pockets for peripheral items such as currency, card and ID, ID pockets, buttons, zippers, magnets, a hook and loop fastener, elastic, and the like. Male and/or female buttons, for instance, can be used on the flaps of the material such that the flap is held in place when the male half of the button is snapped into the female half of the button. Another non-limiting example could use a hook and loop fastener to secure the smart wallet shut. Another non-limiting example could utilize a magnet to hold card and currency holder closed without interfering with the electronics or magnetics of the smart wallet.

Figure 35:
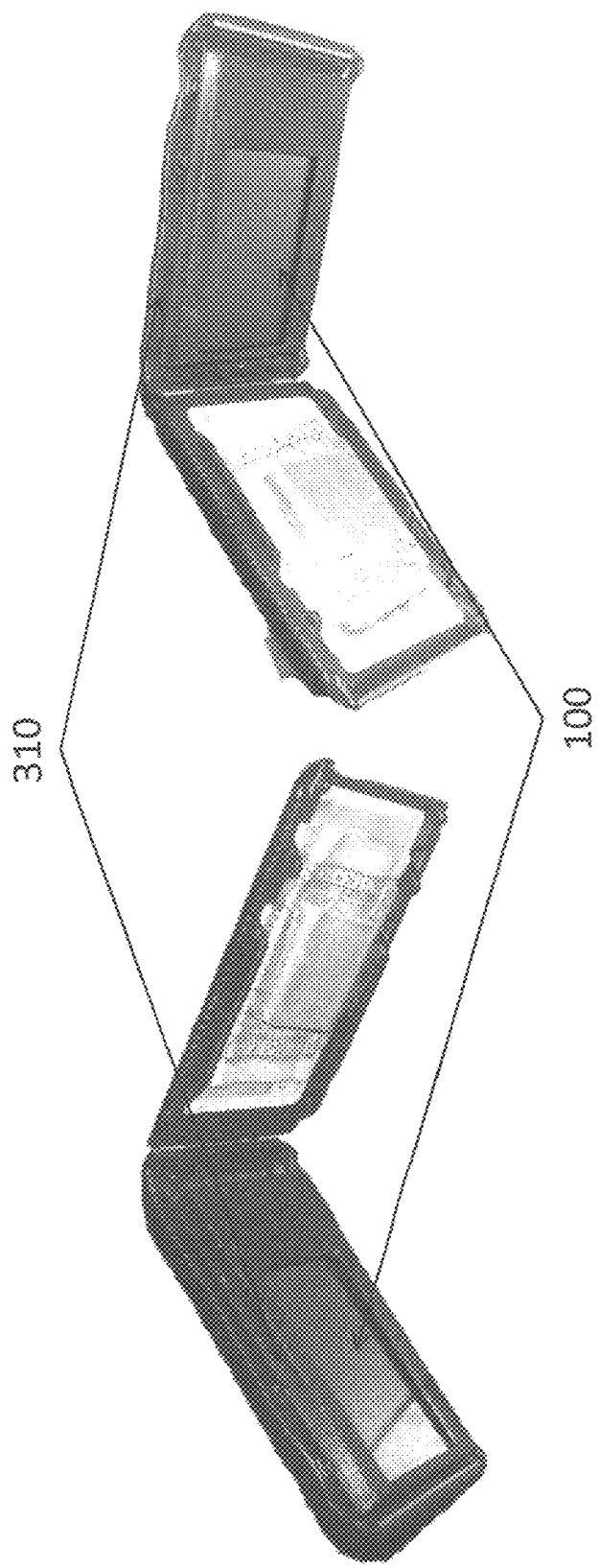
FIG. 35 illustrates a wallet with electronics components embedded therein.

Other non-limiting examples include one or more simple clips that hold electronics 100 into a pocket of an existing wallet as shown in FIG. 19, while other non-limiting examples include conventional accessories, such as a wallet in this example, having one or more pockets for electronics as shown in FIG. 35.

Accessories may also carry additional electronics to add features to the smart wallet (e.g., the electronics and/or the electronic enclosure). In such embodiments, features such as LTE, 4G, WiFi and/or NFC may be added to the smart wallet by simply adding electronic features to the accessory. Connectivity can then be achieved between the accessory and the smart wallet electronics via electronic connectivity between the two devices, such as but not limited to a headphone jack, USB or other type of electronic connector. Likewise, such a connector may be used as a docking technique to connect the smart wallet electronics to a peripheral such as a power supply or computer.

Figure 36:
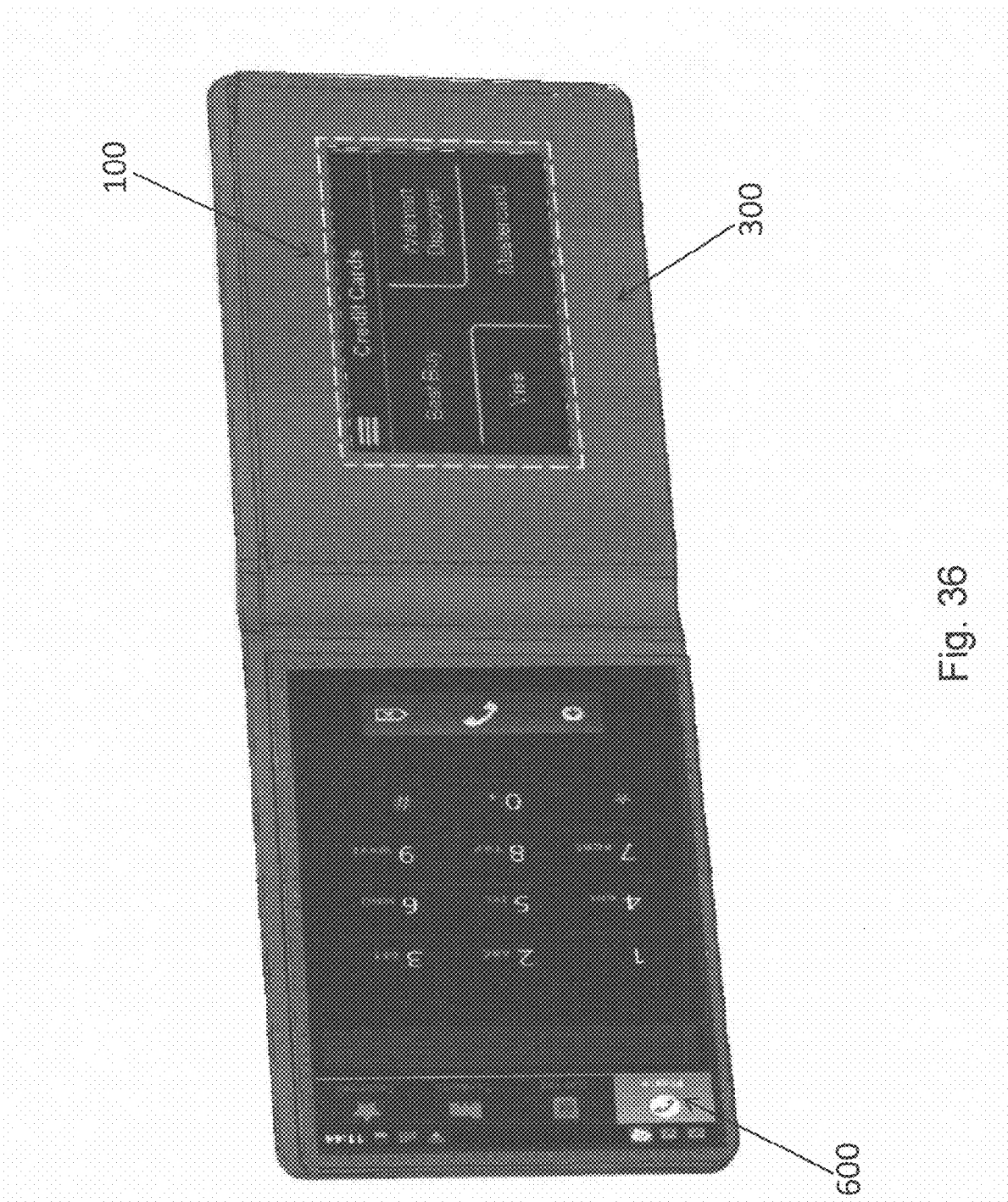
FIG. 36 illustrates a smart wallet integrated with a cell phone.
Figure 37:
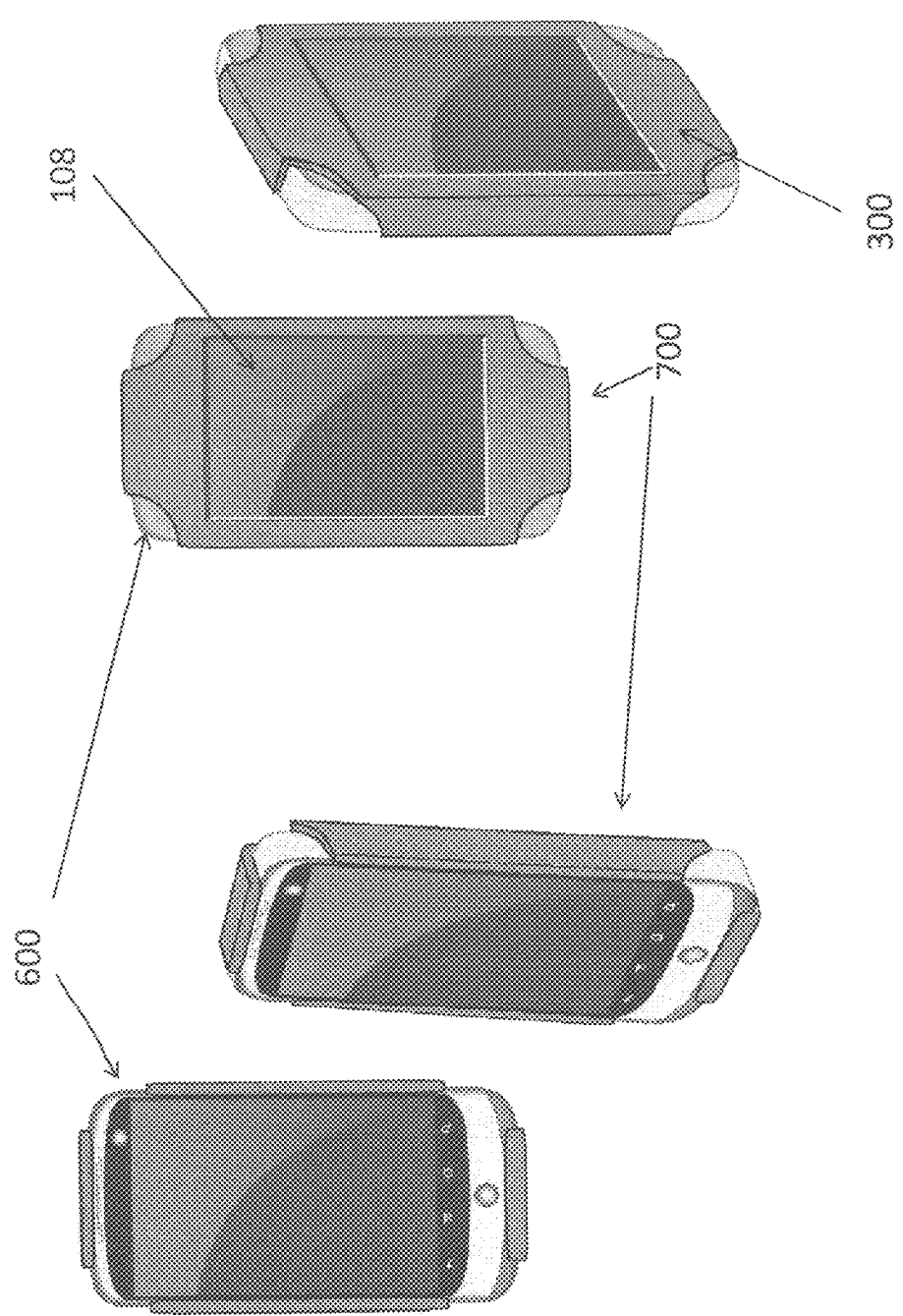
FIG. 37 illustrates a sleeve with integrated electronics for use with a mobile phone.

A smart wallet (e.g., the electronics and/or the electronic enclosure) may comprise a material 300 enclosing electronics 100 as in one non-limiting embodiment of the present invention, attached to a mobile device 600, such as that shown in FIG. 36. Other non-limiting embodiments may be hereafter referred to as a sleeve. In some embodiments, a sleeve 600 may comprise one or more flexible materials 300 as illustrated in FIG. 36. However, in other non-limiting embodiments, the sleeve 600 may comprise a more rigid material. In one embodiment, the sleeve may extend around a phone 601. The sleeve may contain one or more non-limiting electronic components as previously referred to herein. In some embodiments the sleeve may contain one or more screens and/or displays. However, in other embodiments the entire sleeve may be a screen. A non-limiting example may include a sleeve comprising e-paper.

Some embodiments described herein may include several non-limiting mechanical designs of the wallet including a side fold, a top fold, and/or a bottom fold. In other non-limiting embodiments, the sleeve may contain one or more pockets for holding one or more cards. One or more of the pockets may contain non-limiting means for charging one or more of the cards carried with the enclosure, including an inductive coil or metal contacts as in some embodiments. However, in some embodiments no screen or display is used and instead a user may be able to control the wallet and the various functions thereof through means of voice and touch (without a display). As a non-limiting example, a user may be able to speak into a microphone or touch a capacitive area to control the smart wallet. In yet another non-limiting embodiment, a user may use the interface of the phone to control and/or access the wallet and its various functions.

In some embodiments information may be stored in memory device of the sleeve. However, in other non-limiting embodiments, personal information may be stored on a mobile device including but not limited to a smart phone or a tablet and communicate with the smart wallet to make payments and/or provide access to information and/or to perform authentication and/or encrypt/decrypt.

Using one or more of the communication protocols or methods as referred to herein, a sleeve or various components of the sleeve may communicate with one or more outside devices including but not limited to a point-of-sale terminal, a payment network, an acquirer (i.e., a third party who connects a merchant to a payment network), an acquiring processor or an issuer, a powered card, or virtually any other device.

Figure 38:
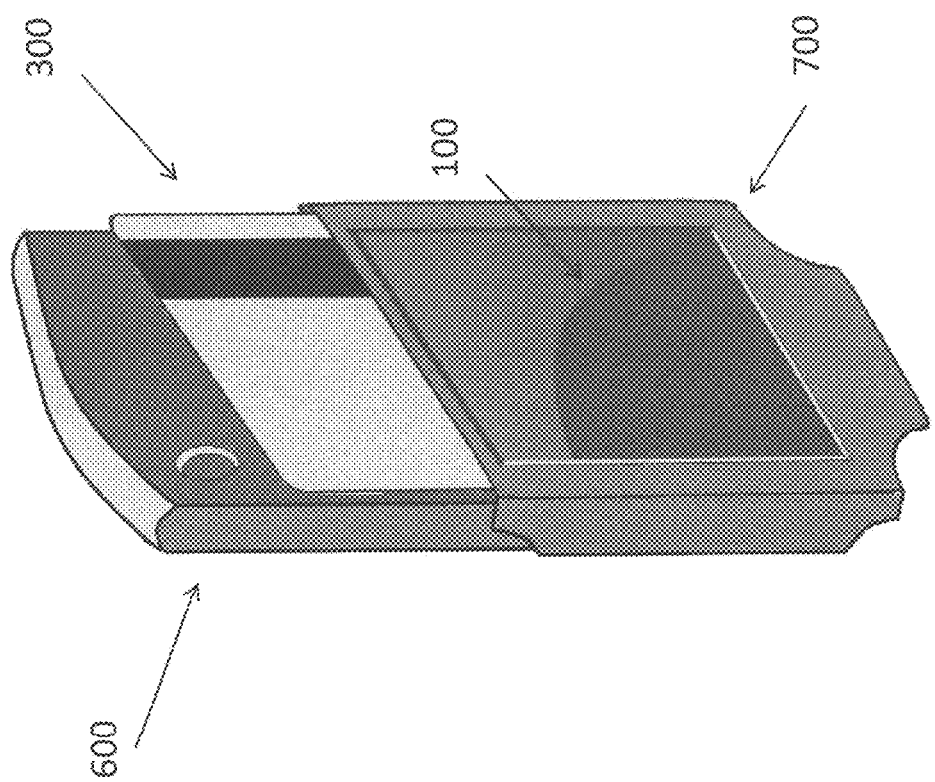
FIG. 38 illustrates a sleeve with integrated electronics that when attached to a mobile device, forms a pocket large enough for a card to be housed, inserted and removed.

As shown in FIG. 38, a sleeve 700 (first accessory 400) integrated with some electronics 100 may form a pocket whereby a second accessory 800, such as but not limited to one or more cards 500, may be inserted. In other embodiments such as that illustrated in FIG. 39, a second accessory 800, such as but not limited to a wearable, a watch in this example, may be charged by the sleeve 700 and/or first accessory 400. In some embodiments, the electronics for the smart wallet may be integrated into another accessory to a primate device, such as the band of a watch. As previously discussed, the proximity of the first accessory 400 to the second accessory 800 enables wake-up, communications, and charging.

In one non-limiting method of the present invention, one or more of the non-limiting electronic components as previously described herein may be combined with any object made of or containing material. Such objects (sometimes referred to as a wallet or wallets) may include but are not limited to wallets, backpacks, clothing, luggage, writs bands, watches, watch bands, anklets, necklaces, purses, or any other non-limiting object made of or containing material. In some non-limiting embodiments, such electronics may act as or be used in combination with a locking mechanism. Further, as used herein, the term wallet includes wallets, backpacks, clothing, luggage, wrist bands, watches, watch bands, anklets, necklaces, purses, or any other object made of or containing material.

When used herein, accessory as a descriptive term refers to any item that may attach to or detach from a main wallet body (also referred to as a wallet) to provide additional look and feel or functionality to the wallet.

What is claimed is:

1. A device comprising:
an enclosure for supporting first electronics components and energy emitting components, the enclosure defining an opening therein;
a button cover disposed within the opening;
an electrical switch supported by the enclosure and disposed proximate a rear surface of the button cover, the electrical switch for controlling functions of the device responsive to application of a force to a front surface of the button cover;
an accessory mount affixed to the enclosure and defining a pocket between the enclosure and the accessory mount; and
a card comprising second electronics components, a rechargeable power source, and energy receiving components, the card for disposing within the pocket, such that energy emitted by the energy emitting components is received by the energy receiving components for charging the power source.

2. The device of claim 1 wherein the button cover carries a logo.

3. The device of claim 1 wherein the switch activates the first or second electronics components, voice authentication, a voice card, or a touch interface, an embedded fingerprint sensor, a voice biometric sensor, a facial biometric sensor, an iris biometric sensor, a heartbeat scanner or a reader.

4. The device of claim 1 the accessory mount defining a pocket on an exterior-facing surface thereof, the pocket for carrying a transaction card or cash.

5. The device of claim 1 wherein the accessory mount is attached to the enclosure by any one of magnetic attraction forces, a groove on one of the accessory mount and the enclosure and a mating rail on another of the accessory mount and the enclosure, clasps on one of the accessory mount and the enclosure for capturing portions of a perimeter of another one of the accessory mount and the enclosure.

6. The device of claim 1 data exchanged between the first and second electronics components.

7. The device of claim 1 the accessory mount comprising a pocket formed by a material sheet having opposing first and second material sheet edges affixed to respective first and second opposing edges of the accessory mount to form the pocket on an exterior facing surface of the accessory mount.

8. The device of claim 1 the enclosure further comprises any one of a display, a touch screen for controlling the first electronics components, and a microphone for receiving voice commands for controlling the first electronics components.

* * * * *